United States Patent
Harvell

(10) Patent No.: US 9,571,407 B2
(45) Date of Patent: Feb. 14, 2017

(54) STRATEGICALLY SCHEDULING TCP STREAM TRANSMISSIONS

(71) Applicant: Limelight Networks, Inc., Tempe, AZ (US)

(72) Inventor: Bradley B. Harvell, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 238 days.

(21) Appl. No.: 14/566,071

(22) Filed: Dec. 10, 2014

(65) Prior Publication Data

US 2016/0173394 A1 Jun. 16, 2016

(51) Int. Cl.
*H04L 12/825* (2013.01)
*H04L 29/06* (2006.01)

(52) U.S. Cl.
CPC .............. *H04L 47/25* (2013.01); *H04L 67/42* (2013.01)

(58) Field of Classification Search
CPC ...... H04L 69/163; H04L 69/168; H04L 47/25; H04L 67/42
See application file for complete search history.

(56) References Cited

U.S. PATENT DOCUMENTS

| 5,815,689 A | 9/1998 | Shaw et al. |
|---|---|---|
| 7,715,324 B1 | 5/2010 | Harvell et al. |
| 8,520,520 B2 * | 8/2013 | Moore ................ H04L 12/5693 370/235 |
| 8,588,077 B2 | 11/2013 | Oran |
| 8,612,622 B2 | 12/2013 | Swanson et al. |
| 8,819,187 B1 | 8/2014 | Hofmann |
| 2004/0111523 A1 | 6/2004 | Hall et al. |
| 2007/0076693 A1 * | 4/2007 | Krishnaswamy ... H04L 12/5695 370/352 |
| 2009/0122808 A1 | 5/2009 | Sharif-Ahmadi et al. |
| 2009/0292824 A1 | 11/2009 | Marashi et al. |
| 2009/0316579 A1 * | 12/2009 | Tang ....................... H04L 47/10 370/231 |
| 2015/0012586 A1 * | 1/2015 | Ozawa .................... H04L 47/11 709/203 |

FOREIGN PATENT DOCUMENTS

| WO | 0105099 A1 | 1/2001 |
|---|---|---|
| WO | 2010060106 A1 | 5/2010 |

OTHER PUBLICATIONS

Han T. et al., "On Accelerating Content Delivery in Mobile Networks", Retrieved on Jan. 27, 2015 from http://web.njit.edu/~th36/published%20paper/On%20Accelerating%20Content%20Delivery%20in%20Mobile%20Networks.pdf, Oct. 22, 2012, 20 pages, vol. PP, Issue: 99, IEEE Communications Society.

(Continued)

*Primary Examiner* — Joe Chacko
(74) *Attorney, Agent, or Firm* — Snell & Wilmer, LLP

(57) ABSTRACT

Provided are methods, systems and computer program products for improving TCP stream transmissions by establishing a transmission schedule and making modifications to the timing and/or rate at which data packets are transmitted based on a timing of acknowledgment signals received in response to transmitted data packets.

20 Claims, 15 Drawing Sheets

(56) References Cited

OTHER PUBLICATIONS

De Cicco, L., et al., "An experimental evaluation of Akamai adaptive video streaming over HSDPA networks", Retrieved on Jan. 27, 2015 from http://ieeexplore.ieee.org/xpl/login.jsp?tp=&arnumber=6044545, Sep. 28-30, 2011, 6 Pages, Computer-Aided Control System Design (CACSD), 2011 IEEE International Symposium, Denver, CO, USA.

Li Z., et al., "Probe and Adapt: Rate Adaptation for HTTP Video Streaming at Scale", Retrieved on Jan. 27, 2015 from http://arxiv.org/pdf/1305.0510.pdf, Jul. 7, 2013, 15 pages, Cisco Systems, San Jose, CA USA.

Mastin P., "Why TCP acceleration matters to the CDN—Part 3", Retrieved on Jan. 27, 2015 from http://www.internap.com/2012/05/08/why-tcp-acceleration-matters-to-the-cdn-part-3/, May 8, 2012, 3 Pages, Internap Website.

\* cited by examiner

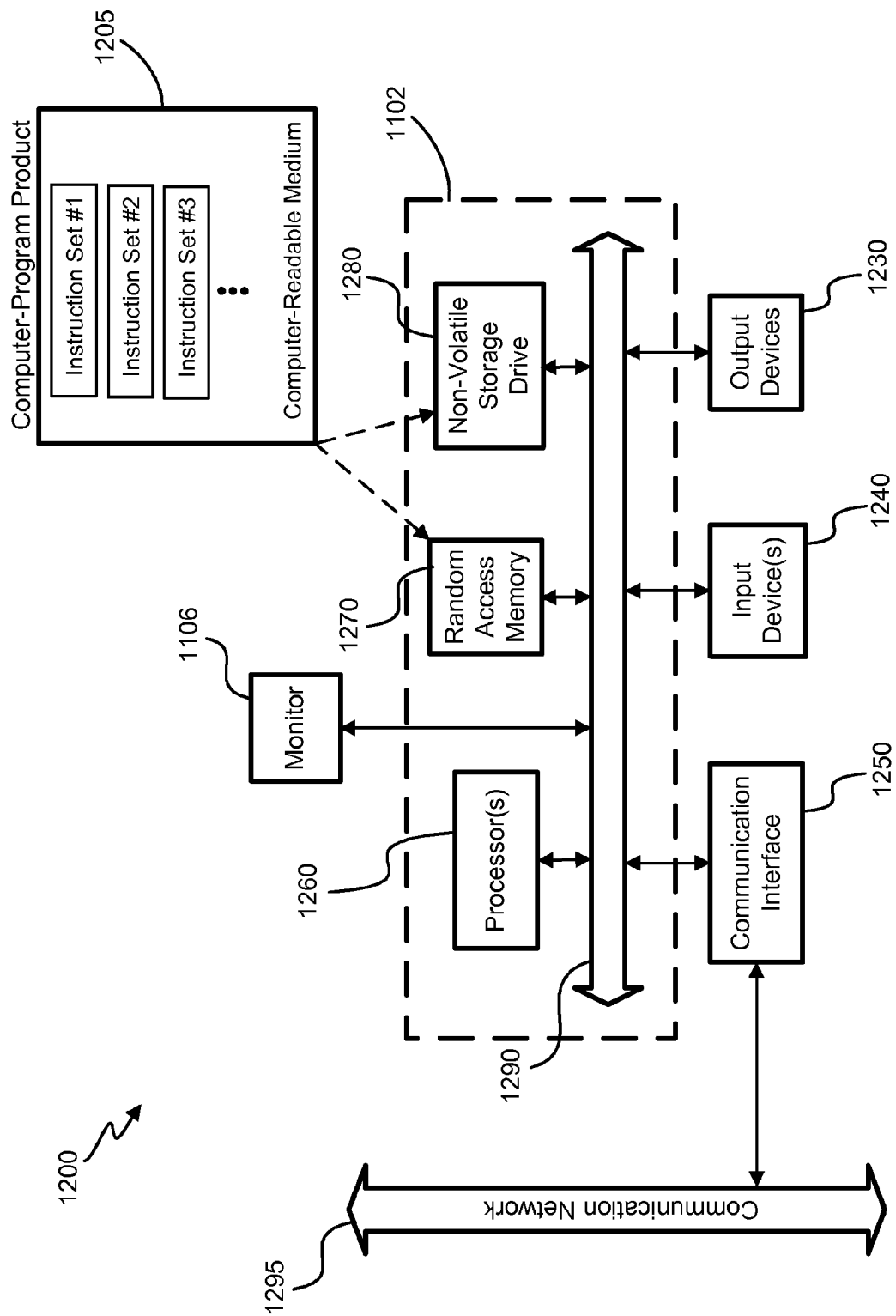

STRATEGICALLY SCHEDULING TCP STREAM TRANSMISSIONS

BACKGROUND

This disclosure relates in general to content delivery over the Internet and, but not by way of limitation, to content delivery networks amongst other things.

Content delivery networks (CDNs) have a geographically distributed network of points of presence (POPs) such that one is likely to be close to an end user. A request for content is matched to a nearby POP using routing, domain name service (DNS) diversion, redirection, Anycast and/or other techniques. An edge server in the POP generally serves the content from a cache of the edge server, a host within the CDN, or an origin server depending on where the content is located. For content that is missing from the CDN, the request to the origin server can be costly in terms of quality of service (QoS). QoS can also be impacted by dropped packets and the associated delay, including due to the retransmission of packets.

BRIEF SUMMARY

Provided are methods, systems and computer program products for improving TCP stream transmissions by establishing a transmission schedule and making modifications to the timing and/or rate at which data packets are transmitted based on a timing of acknowledgment signals received in response to transmitted data packets. Aspects of the invention provide smoothed TCP data stream transmissions that may reach a maximum or substantially maximum transmission rate and that suffer minimal performance impacts from high latency and from low levels of packet loss.

Sending packets of data too slowly will reduce transfer speed to essentially match that of the packet transmission data rate. Transmitting packets of data too fast, on the other hand, may cause congestion, packet loss and erratic behavior, such as where the data rate changes frequently between a high data rate and a low data rate, due to the way TCP handles congestion and flow control. For example, if delivery of network packets is not completed in a timely manner, network buffers may begin to fill until additional network packets cannot be handled and are dropped, resulting in the transmitting system throttling back the speed at which packets are sent. Such a situation may happen, for example, if the system transmitting the packets of data does so at a rate faster than the receiving system can receive the packets.

Such a situation may commonly occur where the data rate for most portions of a network path are relatively high (e.g., 1 Gbps or more) and the last one or two segments have a lower data rate (e.g., a 50 Mbps cable modem, 15 Mbps DSL, 45 Mbps Wi-Fi, etc.). For network paths that have a long latency or round trip time, this situation may also be encountered, as it may take significant time (e.g., 0.5 second to 1.0 second or more) to receive acknowledgment signals for the data that has already been sent by the transmitting system and for the transmitting system to adjust its data transmission rate in response to receiving the acknowledgment signals or lack thereof, corresponding to dropped packets.

The delay between successive acknowledgment signals, in embodiments, provides a useful metric for determining the time required for receipt of packets of data. For example, this time period may correspond to the time required for receipt and processing of a single packet of data. In configurations where TCP delayed acknowledgments are implemented, the time between receiving successive acknowledgment signals may correspond to the time required for receipt and processing of two packets of data. In either case, the time period between successive acknowledgment receipts may provide a useful measure of the time required for receipt of a known quantity of data.

In the case where every received packet of data is acknowledged, the time period between successive acknowledgment signals may correspond to the time required to receive a single packet, such as a packet comprising a single, full size, Ethernet frame, or about 1500 bytes. In the case where every other received packet of data is acknowledged, the time period between successive acknowledgment signals may correspond to the time required to receive two packets, such as two packets each comprising a single, full size, Ethernet frame, or about 3000 bytes total. If, for example, a 1.0 millisecond delay between successive acknowledgment signals were encountered, this may indicate that the receiving system was capable of receipt of about 12 Mbps or about 24 Mbps, depending upon whether delayed acknowledgments are implemented. Other data rates are possible and aspects of the invention utilize the time period between receipt of successive acknowledgment signals as a measurement of data rate in order to continually refine the rate at which network packets are transmitted. In an exemplary embodiment, the rate at which packets are transmitted is adjusted to substantially match the rate at which they are received. In an exemplary embodiment, the rate at which packets are transmitted is adjusted to be smaller than the rate at which they can be received.

In embodiments, aspects of the invention are implemented in a network stack, such as a transmission control protocol (TCP)/Internet protocol (IP) stack, that is modified to allow for scheduling of the transmission of TCP packets. For example, in one embodiment a TCP/IP stack is modified to include changes to the TCP transport layer to implement aspects of the invention, such as to allow for changing the packet transmission rate based upon a time delay between receipt of acknowledgment signals. Aspects of the invention that relate to scheduling of the transmission of network packets may be incorporated into the TCP transport layer in addition to the well-known aspects of TCP relating to flow control and congestion control and avoidance that are used by various TCP implementations and that will be understood by the skilled artisan. In some embodiments, a modified UDP transport layer may incorporate aspects of the invention. In other embodiments, a second transport layer implemented on top of UDP may be configured to implement aspects of the invention, such as to allow for scheduling of data stream transmissions, reliability, flow control, etc.

In a specific embodiment, in order to implement aspects of the invention, only modification of the transport layer of the transmitting system is necessary. For example, the TCP layer of the transmitting system may be modified such that it is still interoperable with existing TCP layers of receiving system, but additional functionality is added to implement the aspects described herein. In one embodiment, a TCP layer is modified to include additional countdown timers that track the time between transmissions of packets of a content object. For example, rather than simply transmitting all packets as soon as the lower layers are ready for accepting the packets, a delay may be introduced that slows down the rate at which packets are passed to a lower layer, such as an IP layer. In this way, the TCP layer can function to follow a specified packet transfer schedule while requiring no changes to the receiving system. In other embodiments, a TCP layer is modified to include additional timers that track the delay between receipt of consecutive acknowledgment signals. Such a configuration may advantageously provide the ability to determine an approximate rate at which packets are being received by the receiving system, such as an end-user system.

The skilled artisan will understand that, although aspects of the invention are described herein with respect to use for content delivery networks, the principles described herein are useful for virtually any network connected system that sends content over a network in packetized form and receives acknowledgment receipts upon successful delivery of the packets. The scope of the disclosure and invention described herein is not intended to be limited to use in content delivery networks. Further, aspects of the invention are described herein with respect to transmission of content objects across a network, the principles described herein are useful for transmission of any data over a network in packetized form and the scope of the disclosure and the invention described herein is not intended to be limited to use solely for delivery of content objects. Additionally, aspects of the invention are described herein with respect to transmission of data across a network in response to requests for data, the principles described herein are useful for transmissions of data that are not based on requests for data and the invention described herein is not intended to be limited to data transmissions in response to requests for data.

In an aspect, the present invention provides system for delivering content objects from a content delivery network to client systems, such as end-user systems, over an Internet. For example, in an embodiment, a system of this aspect comprises a server, such as a server configured to receive requests to deliver content objects to client systems, and a cache for storing a schedule of timing and rates of transmissions of packets of data including portions of requested content objects, such as a schedule that comprises an initial packet transfer rate. In various embodiments, the requests for content objects are from client systems, such as end-user systems. In various embodiments, virtually any server for delivering content objects over the internet is useful in a system of this aspect. In a specific embodiment, the server is one of a plurality of servers in a point of presence of a content delivery network, the content delivery network includes a plurality of points of presence distributed geographically and the content delivery network delivers content over the Internet to client systems. In an exemplary embodiment, the server is further configured to determine the schedule, transmit a first plurality of packets of data according to the schedule, such as a first plurality of packets of data including portions of requested content objects distributed among the first plurality of packets of data, receive acknowledgment signals in response to packets of data of the first plurality of packets of data, determine changes to the schedule based on a timing of receipt of the acknowledgement signals in response to packets of data of the first plurality of packets of data and transmit a second plurality of packets of data according to the schedule, such as a second plurality of packets that include portions of requested content objects distributed among the second plurality of packets of data. In some embodiments, a time difference between receipt of consecutive acknowledgment signals in response to packets of data of the first plurality of packets of data is used to determine an updated packet transfer rate and changes to the schedule are made using the updated packet transfer rate; and Systems of this aspect optionally include the ability to investigate whether it is possible or desirable to send packets of data at a rate faster than specified by the schedule and to update the schedule to specify a faster packet transfer rate. For example, optionally, the server is further configured to transmit a third plurality of packets of data at a rate faster than the updated packet transfer rate, such as a third plurality of packets of data including portions of requested content distributed among the third plurality of packets of data. Optionally, the server is further configured to receive acknowledgment signals in response to packets of data of the third plurality of packets of data and determine changes to the schedule based on a timing of receipt of the acknowledgment signals in response to packets of data of the third plurality of packets of data. For example, in one embodiment, a time difference between receipt of consecutive acknowledgment signals in response to packets of data of the third plurality of packets of data is used to determine a further updated packet transfer rate and changes to the schedule are made using the further updated packet transfer rate. Optionally, the server is configured to transmit a fourth plurality of packets of data according to the schedule with portions of requested content objects distributed among the fourth plurality of packets of data.

In some embodiments, it may be determined that multiple client systems are located on a subnet which is served by a network link that may limit the packet transmission rate to all client systems on the subnet. For example, in one embodiment, the server is further configured to receive requests to deliver content objects to a plurality of client systems having a common network subnet; and use the schedule for transmitting packets of data for requested content to the plurality of client systems.

Systems of this aspect optionally use the received acknowledgment signals to determine updates to a schedule or packet transfer rate by determining a perceived rate at which packets are received by the client system, such as an end-user system. Various modifications to the schedule may be implemented based on the timing of acknowledgment packets received. For example, in an embodiment, a plurality of time differences between receipt of consecutive acknowledgment signals in response to packets of data of the first plurality of packets of data are used in a statistical analysis to determine the updated packet transfer rate.

In some embodiments, other information is used to determine the schedule or to make modifications to the schedule. For example, in one embodiment, the server is configured to determine the schedule by receiving application level information from a client system and selecting the initial packet transfer rate based on the application level information. Useful application level information includes, but is not limited to, a client application User-Agent, a content type of the content objects, and a content length of the content objects. Optionally, the server is configured to determine the schedule or changes to the schedule by receiving Internet address geolocation or provider information or Internet address network characteristics and selecting the initial packet transfer rate based on the Internet address geolocation or provider information or Internet address network characteristics. For example, in one embodiment, the Internet address geolocation or provider information or Internet address network characteristics identifies a client wireless network connection. Optionally, the initial packet transfer rate is selected to match characteristics of a wireless network connection to the client system. In some embodiments, changes to the schedule are determined using a sensitivity factor that is dependent upon the Internet address geolocation or provider information or the Internet address network characteristics. Optionally, the server is configured to determine the schedule or changes to the schedule using one or more of a time of day, a day of week, historical network congestion information, historical client network characteristics or historical client system Internet service provider characteristics.

In another aspect, provided are methods for delivering content objects to client systems over the Internet, such as from a content delivery network to client systems over the Internet. In one embodiment, a specific method of this aspect comprises receiving a request to deliver one or more content objects to a client system, such as a request from a client system that is received at a server, determining a schedule for transmitting packets of data including portions of the one or more content objects, such as a schedule that includes an initial packet transfer rate, transmitting a first plurality of packets of data according to the schedule with portions of the one or more content objects distributed among the first plurality of packets of data, receiving acknowledgment signals in response to packets of data of the first plurality of packets of data and determining changes to the schedule based on a timing of receipt of the acknowledgment signals in response to packets of data of the first plurality of packets of data. In a specific embodiment, a time difference between receipt of consecutive acknowledgment signals in response to packets of data of the first plurality of packets of data is used to determine an updated packet transfer rate and changes to the schedule are made using the updated packet transfer rate. A method of this aspect optionally further comprises transmitting a second plurality of packets of data according to the schedule, such as where the schedule has been updated with an updated packet transfer rate, with portions of the one or more content objects distributed among the second plurality of packets of data. Optionally, the server is one of a plurality of servers in a point of presence of a content delivery network, the content delivery network includes a plurality of points of presence distributed geographically and the content delivery network delivers content over the Internet to client systems.

Various embodiments further comprise determining whether to transmit additional packets of data at a rate faster or slower than that specified by the schedule. For example, in one embodiment, a method of this aspect further comprises transmitting a third plurality of packets of data at a rate faster than the updated packet transfer rate, wherein portions of the one or more content objects are distributed among the third plurality of packets of data, receiving acknowledgment signals in response to packets of data of the third plurality of packets of data and determining changes to the schedule based on a timing of receipt of the acknowledgment signals in response to packets of data of the third plurality of packets of data. For example, in embodiments, a time difference between receipt of consecutive acknowledgment signals in response to packets of data of the third plurality of packets of data is used to determine a further updated packet transfer rate and changes to the schedule are made using the further updated packet transfer rate. Optionally, methods of this aspect further comprise transmitting a fourth plurality of packets of data according to the schedule, wherein portions of the one or more content objects are distributed among the fourth plurality of packets of data.

As described above, in some embodiments, multiple client systems may exist on a common subnet that is served by a network link that may limit the rate at which packets can be delivered to the subnet. For example, in one embodiment, the client system is a first client system and the method further comprises receiving a second request to deliver one or more additional content objects to a second client system, such as where the second request is from the second client system and is received at the server and where the second client system is on the same subnet as the first client system, and transmitting a third plurality of packets of data to the second client system according to the schedule, with portions of the one or more additional content objects distributed among the third plurality of packets of data. In embodiments, for example, the second client system is on a same network subnet as the first client system and the schedule includes the initial or updated packet transfer rate.

In various embodiments, changes to the schedule are made using a variety of information. For example, in one embodiment, a plurality of time differences between receipt of consecutive acknowledgment signals in response to packets of data of the first plurality of packets of data are used in a statistical analysis to determine the updated packet transfer rate. Optionally, determining the schedule or changes to the schedule includes receiving application level information from the client system and selecting the initial packet transfer rate based on the application level information. Optionally, determining the schedule or changes to the schedule includes receiving Internet address geolocation or provider information or Internet address network characteristics and selecting the initial packet transfer rate based on the Internet address geolocation or provider information or Internet address network characteristics. For example, in embodiments, the Internet address geolocation or provider information or Internet address network characteristics identifies a client wireless network connection and the initial packet transfer rate is selected to match characteristics of the wireless network connection. Optionally, changes to the schedule are determined using a sensitivity factor that is dependent upon the Internet address geolocation or provider information or the Internet address network characteristics. In various embodiments, determining the schedule or changes to the schedule or packet transfer rate includes using one or more of a time of day, a day of week, historical network congestion information, historical client network characteristics or historical client system Internet service provider characteristics.

In another aspect, provided are computer-program products, such as computer program products tangibly embodied in a non-transitory machine-readable storage medium. In various embodiments, computer program products embody any of the above described methods. Computer program products of this aspect generally comprise instructions that, when executed by one or more processors in a computing device, cause the computing device to perform a method, such as any of the above described methods. In one specific embodiment, a computer-program product of this aspect includes instructions that, when executed by one or more processors in a computing device, cause the computing device to receive requests to deliver content objects to client systems, determine a schedule of timing and rates of transmissions of packets of data including portions of requested content objects, transmit a first plurality of packets of data according to the schedule with portions of requested content objects distributed among the first plurality of packets of data; receive acknowledgment signals in response to packets of data of the first plurality of packets of data and determine changes to the schedule based on a timing of receipt of the acknowledgement signals in response to packets of data of the first plurality of packets of data. For example, in an embodiment, a time difference between receipt of consecutive acknowledgment signals in response to packets of data of the first plurality of packets of data is used to determine an updated packet transfer rate and changes to the schedule are made using the updated packet transfer rate. In a further embodiment, a computer-program product of this aspects further includes instructions for causing the computing device to transmit a second plurality of packets of data according to the schedule, such as an updated schedule, with portions of requested content objects distributed among the second plurality of packets of data.

In various embodiments, aspects of the present invention are embodied as an application that is executed by a processor on a server, network device or other computing device, such as a computer-program product tangibly embodied on a non-transitory machine-readable storage medium comprising instructions for execution by one or more processors. For example, in embodiments, the above-described methods are implemented in the application layer of a network stack, such as described in the OSI Model or in the TCP/IP model stack. In some embodiments, the described methods utilize application information, also referred to herein as application-level information, to determine a route or transport characteristics to be used with content objects. Similarly, in some embodiments, the above-described methods are implemented as a layer existing on top of the application layer, such as an application or software subroutine that interacts using an application-layer protocol that provides an interface with a transport or network protocol or a communication subsystem. In a specific embodiment, a method implemented in the application layer modifies one or more transport layer or network layer parameters, such as to change the transport path that various network connections traverse. For example, embodiments include assessing application-level information to determine that a request for a content object is to be served over a specific network connection, or through a specific route or that serving a content object is to use specific transport layer, network layer or link layer characteristics.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 12 depicts a block diagram of an embodiment of a special-purpose computer system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present description provides preferred exemplary embodiment(s) only, and is not intended to limit the scope, applicability, or configuration of the disclosure. Rather, the present description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
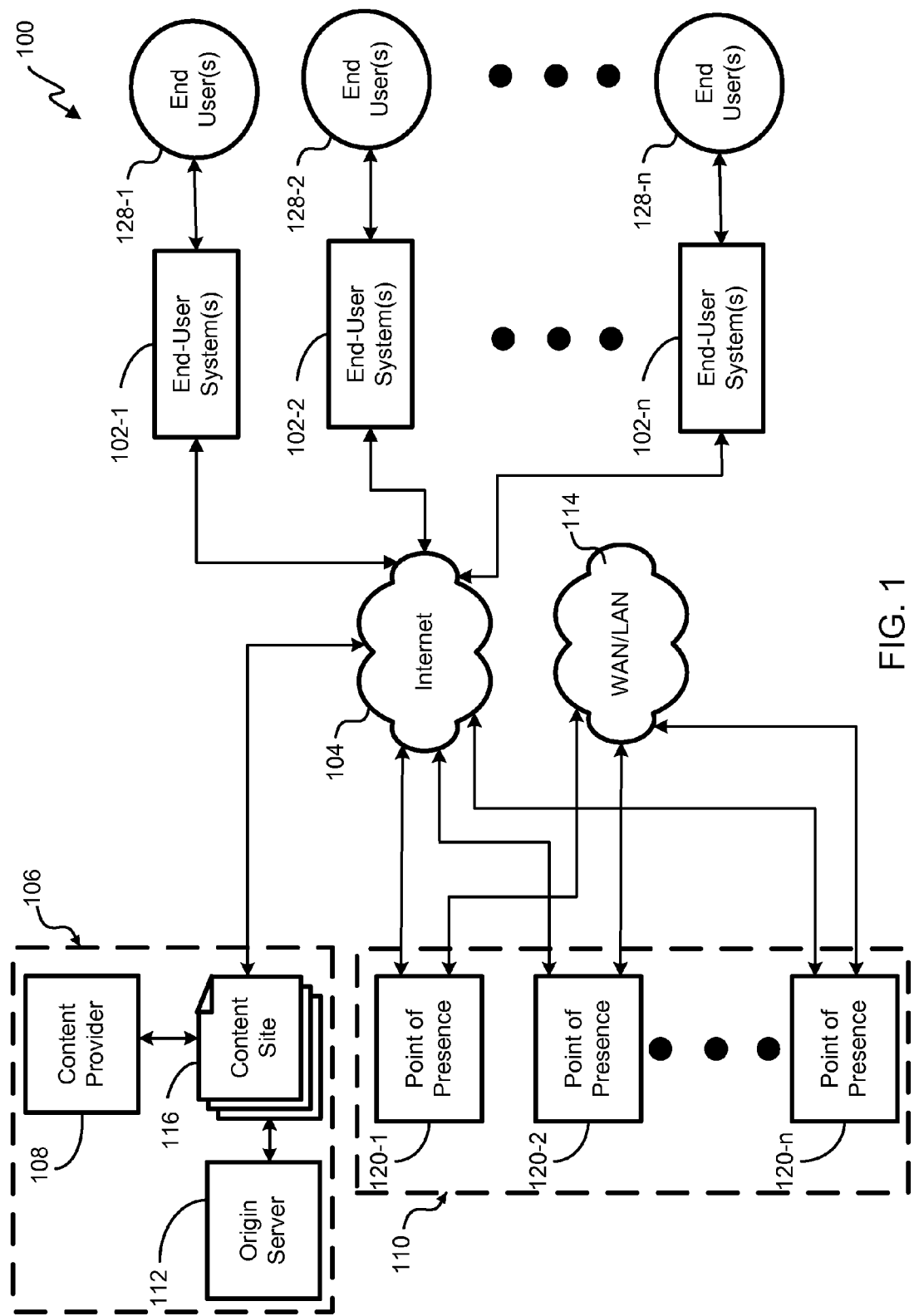
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end-user systems 102 distributed geographically. The content originator 106 is the customer of the CDN 110 and an end user 128 benefits from improvements in QoS.

In this embodiment, the content distribution system 100 locates the content objects (or portions thereof) and distributes the content objects to an end-user system 102. The content objects are dynamically cached within the CDN 110 and/or hosted by the CDN 110. A content object is any content file, content stream, or a range defining a segment of a content file or content stream, and could include, for example, video, pictures, data, audio, software, and/or text. The content object could be live, delayed, or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102. Multiple POPs 120 use the same IP address such that an Anycast routing scheme is used to find a POP likely to be close to the end-user system 102, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing, and caching is provided by the CDN 110.

When an end user 128 requests a web page (or other content) through its respective end-user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end-user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into a uniform resource identifier (URI) for a web page. In any event, the request for content is handed over to the CDN 110 in this embodiment by using an Anycast IP address corresponding to two or more POPs 120. In some embodiments, the CDN 110 hosts content objects and/or web pages, thus acting as the origin server 112.

Once the request for a content object is passed to the CDN 110, the request is associated with a particular POP 120 within the CDN 110 using the Anycast routing scheme, but other embodiments could use routing, redirection, or DNS to shunt requests to a particular POP 120. It is noted that the CDN 110 processes requests for content in the application layer of the open systems interconnection (OSI) model with URIs, URLs, and HTTP. The particular POP 120 may retrieve the portion of the content object from the content provider 108, where the content originator 106 is hosting the origin server 112. Alternatively, the content provider 108 may directly provide the content object to the CDN 110 and POPs 120 associated with the CDN 110 through pre-population of caches (i.e., in advance of the first request) or hosting. A storage policy could be defined to specify the conditions under which pre-population is performed. In this embodiment, content objects are provided to the CDN 110 and stored in one or more CDN servers such that the portion of the requested content may be hosted from the CDN 110. The CDN servers include edge servers in each POP 120 that serve end-user requests. The origin server 112 holds a copy of each content object for the content originator 106. Periodically, the content of the origin server 112 may be reconciled with the CDN 110 through a caching, hosting, and/or pre-population algorithm, for example, through a storage policy. Some content providers 108 could use an origin server 112 within the CDN 110 to host the content and avoid the need to maintain a copy.

Once the content object is retrieved, the content object is stored within the particular POP 120 and is served from that POP to the end-user system 102. The end-user system 102 receives the content object and processes the content object for use by the end user 128. The end-user system 102 could be a personal computer, media player, handheld computer, tablet, pad, Internet appliance, phone, smart phone, IPTV set top, streaming radio, or any other device that receives and plays, displays or renders content objects. In some embodiments, a number of the end-user systems 102 could be networked together. Although this embodiment shows only a single content originator 106 and a single CDN 110, it is to be understood that there could be many of each in various embodiments.

Further, in some cases, the content object is stored within multiple POPs 120 or parts of a content object are distributed across POPs 120, such as where one part of a content object is stored within one POP 120-1 while other parts of the content object are stored within another POP 120-2. Optionally, a first portion of the content object is served from one POP 120-1 to the end-system 102 and a second portion of the content object is served from another POP 120-2 to the end-user system 102. Optionally, the content delivery network 110 includes a policy engine for determining which POP(s) 120 the content object, or portions thereof, is stored. In some embodiments, a policy engine uses information from one or more digests to determine which POP 120 is used to store a content object and/or serve a content object to an end-user system 102. For example, in one embodiment, the policy engine may determine which POP 120 can provide the best QoS for delivery of a content object, or a portion thereof, to an end-user system using information from the one or more digests. In exemplary embodiments, digests that track latency, throughput, jitter, bandwidth, error rates or other network performance metrics between POPs 120 and end-user systems 102 can allow a policy engine to determine which POP to use to store and/or serve content objects.

Figure 2:
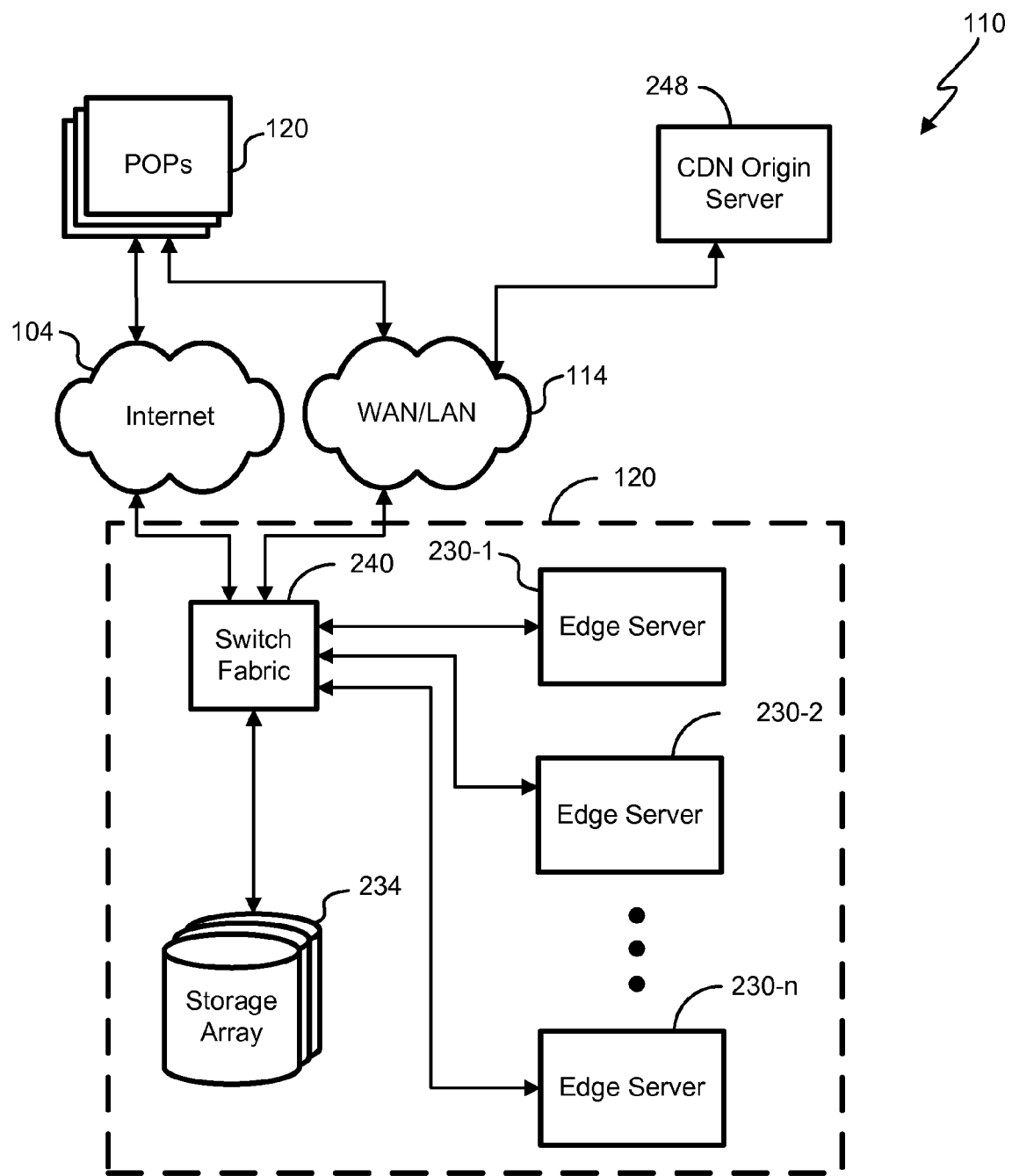
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end-user systems 102. The requests come from an Internet protocol (IP) address of the end-user system 102 in the form of a URI that causes an HTTP get command. The requests for content files from the CDN 110 pass through the application layer.

Switch fabric 240 assigns the request to one of the edge servers 230 according to a routing scheme such as round robin, load balancing, etc. In some embodiments, the switch fabric 240 is aware of which edge servers 230 have what capabilities and assigns requests within the group having the capability to store and serve the particular content object referenced in the URI. Edge servers 230 gathered in a particular group as neighbors can be grouped with other servers in the current POP 120, less loaded servers in the current POP 120, servers having a capability to process the content object, a subset of servers assigned to a customer using the CDN 110 to serve the content object, or some other grouping of servers in the POP 120.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 the content object need not be hosted on an origin server 112 of the content originator 106 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage, and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 120.

Requests from end-user systems 102 are assigned to an edge server 230 that may cache, store, or host the requested content object. At times, the edge server 230 receiving a request does not have the content object stored for immediate serving. This so-called "cache miss" triggers a process within the CDN 110 to find the content object (or portion thereof). The content may be found in neighboring edge servers 230 in the same POP 120, in another POP 120, in a CDN origin server 248, in a POP storage array 234, or even an origin server 112 external to the CDN 110. The various edge servers 230 and CDN origin servers 248 are grouped for various URIs uniquely. In other words, one URI may look to one group of servers 230, 248 on a cache miss while another URI will look to a different group of servers 230, 248.

Figure 3:
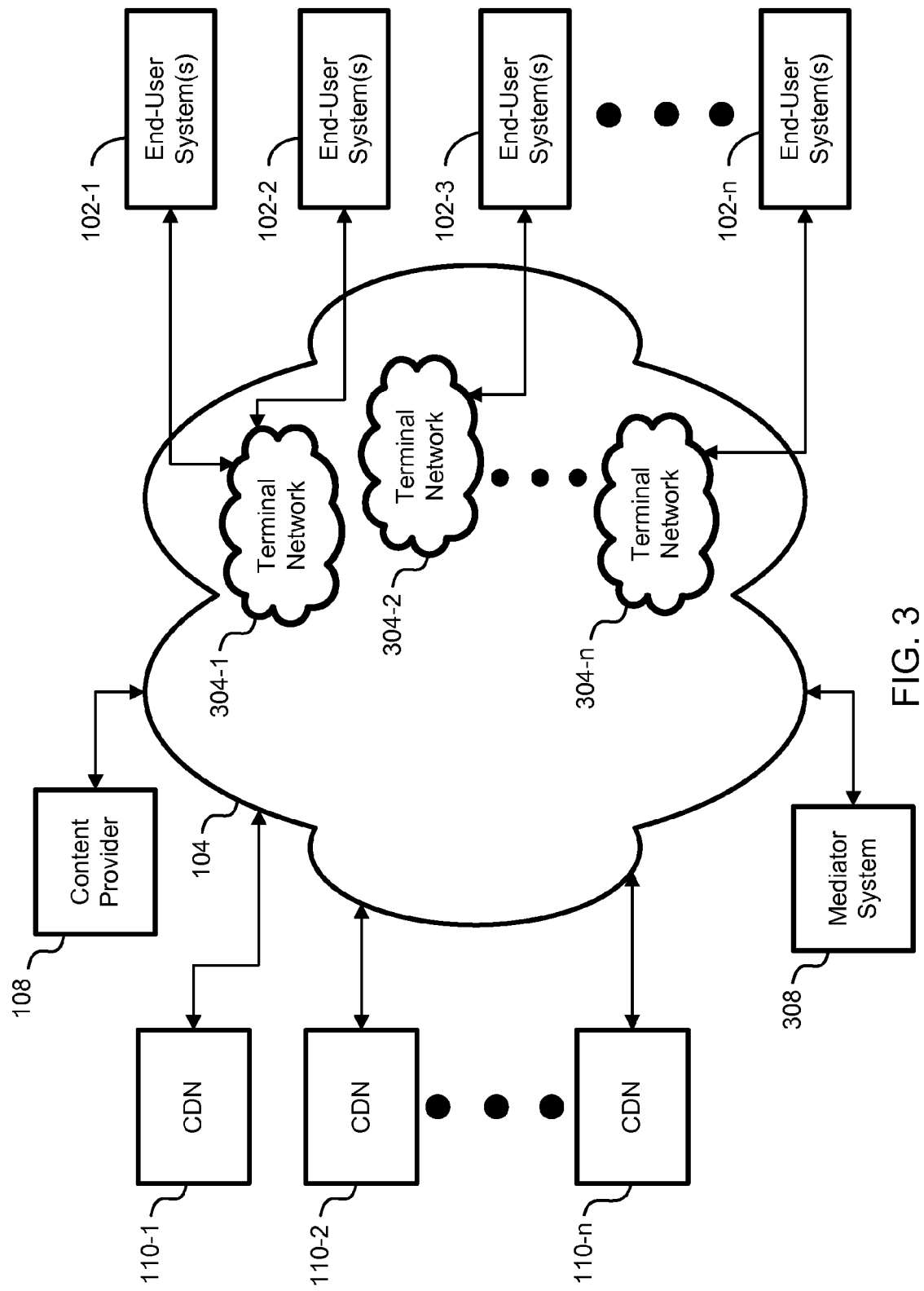
FIG. 3 depicts a block diagram of an embodiment of a cooperative delivery system.

Referring next to FIG. 3, an embodiment of a cooperative delivery system is shown. A content provider 108 is connected to the Internet 104. Also connected to the Internet 104 are a plurality of CDNs 110 and a plurality of end-user systems 102. As part of the Internet 104, a plurality of terminal networks 304 provide Internet service to the plurality of end-user systems 102. In some embodiments, terminal networks 304 are "last mile" networks providing telecommunications, cable television, and/or Internet services to end users 128. Some examples of terminal networks 304 include CenturyLink, Comcast, Verizon, and AT&T. In some embodiments, terminal networks 304 include peer networks. In some embodiments, terminal networks 304 have caches to store content objects. Caches of the terminal networks 304 can be a single cache, or spread out among a plurality of caches similar to a CDN 110 with a plurality of POPs 120. Some terminal networks 304 function as a content delivery network 110.

In this embodiment, the content provider 108 contracts with a first CDN 110-1 for delivery of a content object to end-user systems 102. Though only one content provider 108 is shown, there may be many content providers 108 contracting with CDNs 110 and/or terminal networks 304 for delivery of a plurality of content objects. Also, an origin server 112 having the content object can be external to the CDN 110 or internal to the CDN 110, such as in a CDN origin server 248. In some embodiments, the first CDN 110-1 subcontracts delivery of the content object to a second CDN 110-2 and/or terminal network 304 for delivery to an end-user system 102. The first CDN 110-1 may subcontract delivery of the content object for various reasons. For example, the second CDN 110-2 may have a better coverage of POPs 120 in a given geographic area. The first CDN 110-1 may have several POPs 120 in North America and Europe, but not South America. The second CDN 110-2 may have several POPs 120 in South America. To deliver the content object to an end user 128 in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

In some embodiments, the first CDN 110-1 subcontracts delivery of the content object with terminal networks 304. For example, the first terminal network 304-1 caches the content object when delivering the content object to a first end-user system 102-1. When a second end-user system 102-2 requests the content object, the first terminal network 304-1 serves the content object from a cache of the first terminal network 304-1.

In some embodiments, a mediator system 308 is also connected to the Internet 104. The mediator system 308 serves several functions for the cooperative delivery system, such as assignment, accounting, and control. In some embodiments, the mediator system 308 receives requests for delivery of the content object and assigns a CDN 110 or a terminal network 304 to deliver the content object. The mediator system 308 chooses a CDN 110 or terminal network 304 based on geography, latency in a network, delivery cost, quality of service, etc. In some embodiments, the mediator system 308 contracts with the content provider 108 for delivery of the content object instead of the first CDN 110-1 contracting with the content provider 108 for delivery of the content object. In some embodiments, the mediator system 308 is part of, and/or controlled by, a CDN 110 or terminal network 304. Also, a cooperative delivery system may comprise two or more mediator systems 308, and each mediator system 308 is tied to a particular CDN 110.

In some embodiments, the mediator system 308 accounts for content delivery. After assigning delivery of the content object to a CDN 110 or terminal network 304, the mediator system 308 credits that network with delivery of the content object. In other embodiments, the mediator system 308 receives reports about delivery of the content object before crediting the CDN 110 or terminal network 304 for delivery.

In some embodiments, the mediator system 308 also establishes control parameters for delivery of the content object. For example, the content provider 108 sets a minimum quality of service threshold for delivering the content object. When assigning delivery of the content object, the mediator system 308 passes variables specifying the control parameters to the CDN 110 and/or terminal network 304 delivering the content object.

Figure 4A:
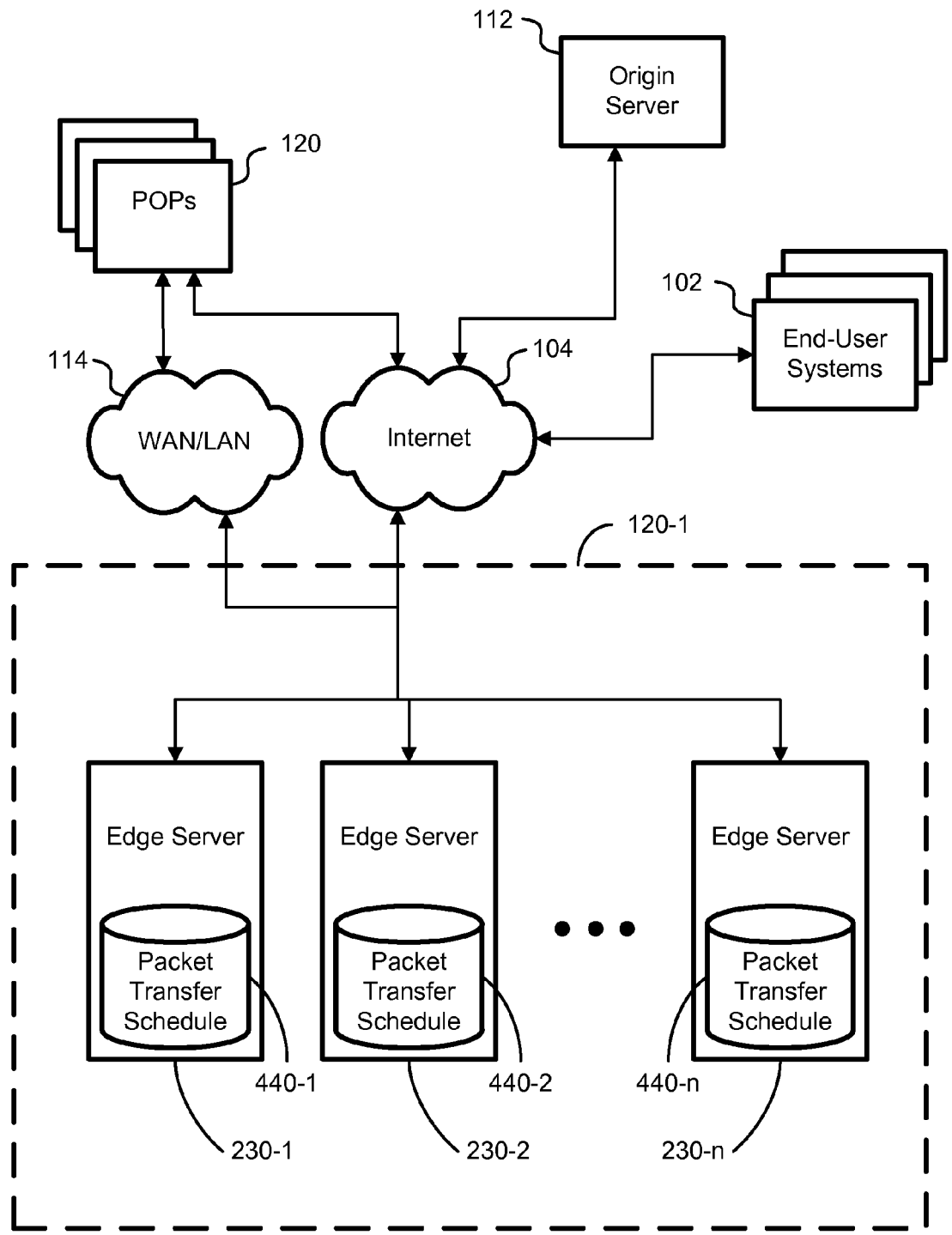
FIG. 4A, FIG. 4B and FIG. 4C depict block diagrams of embodiments of content distribution systems.
Figure 4B:
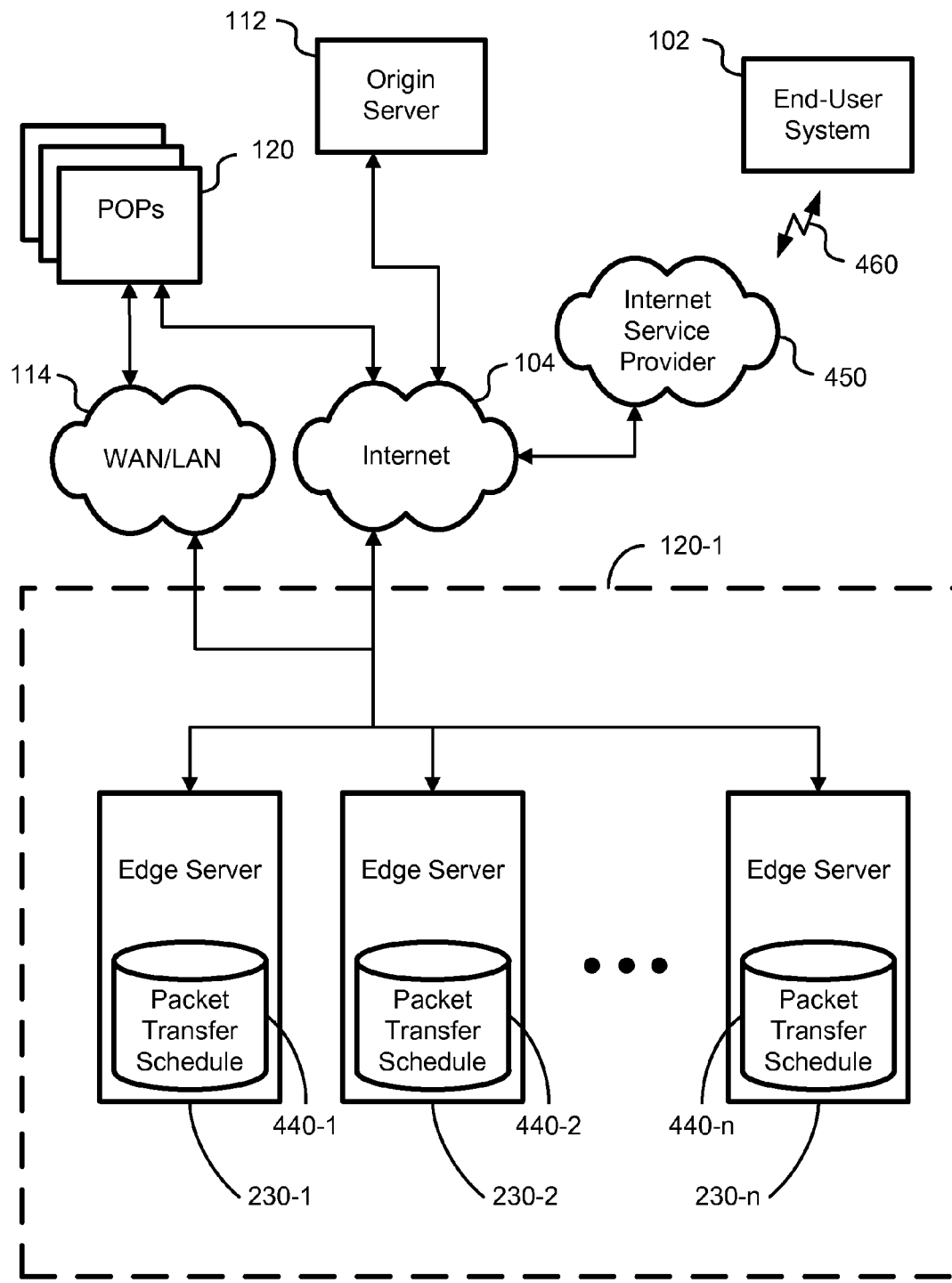
Figure 4C:
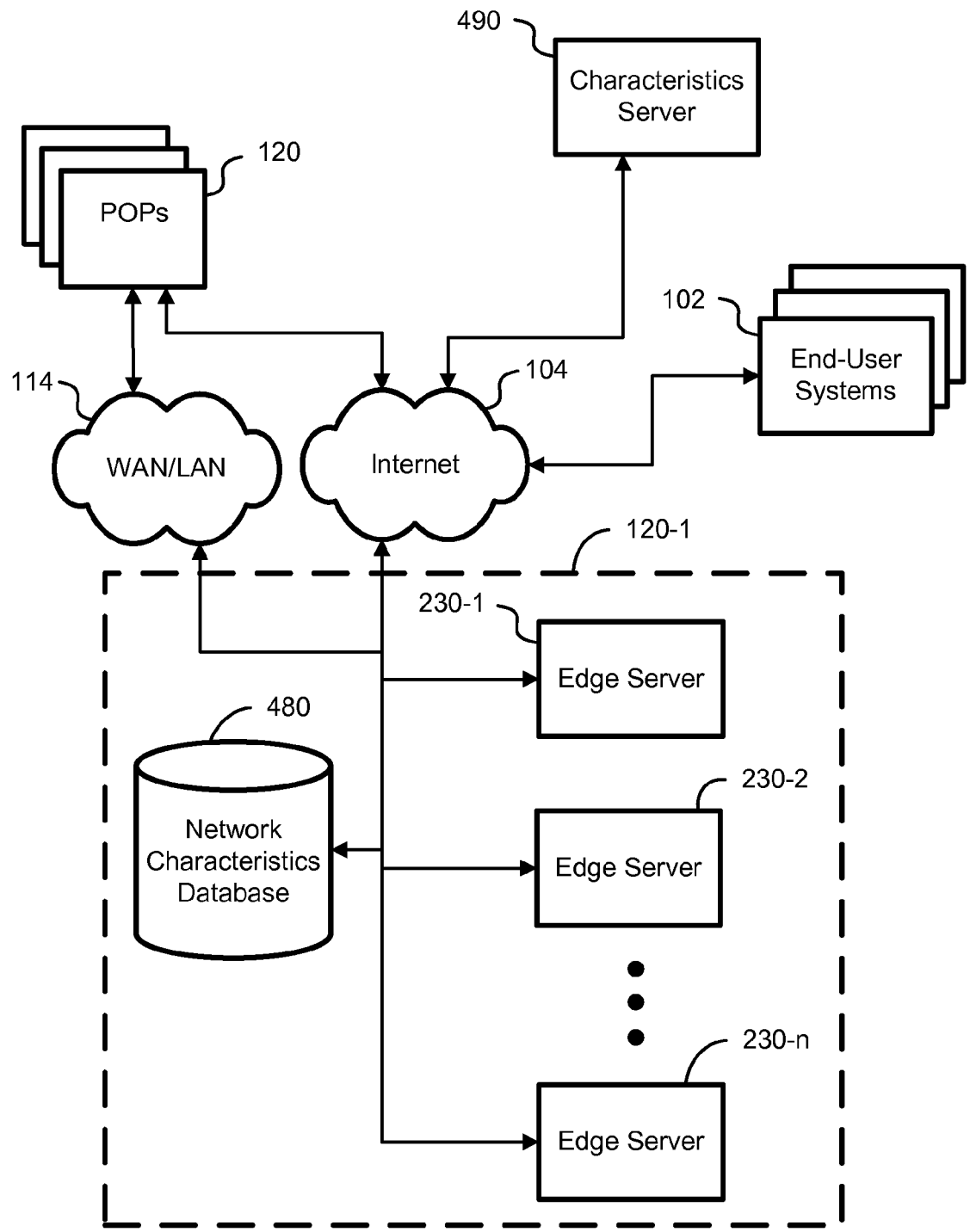

Referring next to FIGS. 4A, 4B and 4C, further embodiments of content distribution systems are shown. In these figures, end-user systems 102 and origin server 112 connect to Internet 104. Points of presence 120 also connect to the Internet 104, but may also connect to one another through a WAN/LAN 114. An expanded view of POP 120-1 is shown in FIGS. 4A, 4B and 4C. Here, edge servers 230 connect to Internet 104, such as for serving content objects to end-user systems 102 or for retrieving content from origin server 112, and to WAN/LAN 114, such as for exchanging data with other POPs 120. As shown in FIGS. 4A and 4B, each edge server 230 includes a packet transfer schedule 440, such as stored within a cache of edge server 230. The packet transfer schedule 440 is used, in embodiments, to select a timing and/or rate at which packets of content objects are transmitted to end-user systems 102.

Various parameters may impact the packet transfer schedule 440 used for serving content objects to end-user systems 102. For example, a connection speed between end-user systems 102 and Internet 104 can establish an initial packet transfer rate as a component of packet transfer schedule 440. In embodiments, the slowest connection between end-user systems 102 and point of presence 120 will establish the maximum rate at which packets are to be transmitted.

For example, although 1 Gbps connections may exist at all points on the Internet 104 between point of presence 120 and end-user system 102 except for a digital subscriber line (DSL) connection that provides, for example a 7 Mbps connection, the 7 Mbps connection will govern the maximum rate at which packets should be transmitted to the end-user system. In embodiments, if packets are transmitted from the point of presence 120 at a data rate of 50 Mbps, when they reach the slowest link of 7 Mbps, the packets will begin to fill a network buffer since they cannot be delivered at such a high data rate. Upon filing the network buffer, some packets will be dropped, resulting in the point of presence 120 failing to receive acknowledgement signals for all the dropped packets and, under general TCP operational principles, reducing the packet transmission rate. Subsequently, the packet transmission rate may be lowered below 7 Mbps and operation under general TCP principles may continuously "hunt" for the appropriate speed for transmission of the data. In other embodiments, another connection speed may limit the transmission of data, such as a DSL connection of a different speed or a cable modem which may nominally provide, for example, a 50 Mbps or 100 Mbps connection.

In many embodiments, however, a wireless connection may be the slowest link between the end-user system 102 and the point of presence 120. For some embodiments, as shown in FIG. 4B, Internet service provider 450 connects end-user system 102 to the Internet 104 by way of a wireless connection 460. A variety of network configurations may provide for wireless connection 460 between end-user system 102 and Internet service provider 450. For example, in embodiments, the end-user system 102 connects directly to Internet service provider 450 over a wireless link, such as where Internet service provider 450 is a wireless or satellite Internet service provider. For example, end-user device may include a cellular data modem, such as for providing a 2G, 3G, 4G or LTE data connection to Internet service provider 450, as is common with smartphones and other mobile devices. In other embodiments, Internet service provider 450 is a cable, DSL or other provider of wired Internet access and the wireless connection 460 exists on a local area network including end-user system 102. For example, in embodiments, end-user system 102 is a tablet, laptop computer or smartphone which connects to the local area network over an 802.11 wireless connection, such as a wireless connection 460 to an 802.11a, 802.11b, 802.11g, 802.11n or 802.11ac wireless router, access point or range extender, while the local area network connects to the Internet service provider 450 over a wired connection. Other wireless configurations are possible, for example, such as where end-user device 102 includes a Bluetooth connection to a local area network, where end-user system 102 connects over a wired connection to a local area network that includes a wireless modem that provides a wireless connection 460 to Internet service provider 450 or where end-user system 102 connects to a local area network wirelessly and the local area network connects to Internet service provider 450 wirelessly.

FIG. 4C illustrates an embodiment of a content distribution system where a point of presence 120 includes network characteristics database 480, which stores information about network characteristics of various end-user systems 102. For example, network characteristics database can include historical connection speed information, historical usage, historical network congestion information, geolocation information, internet service provider characteristics and the like. Network characteristics database 480 is used, in embodiments, to identify an appropriate initial packet transfer rate. Network characteristics database 480 can also be used to keep track of updated packet transfer rates or packet transfer schedules as they are generated so that this information can be reused for serving future content object requests.

A third party characteristics server 490 may also provide network characteristics information to point of presence 120, such as by way of Internet 104. For example, in one embodiment, characteristics server 490 provides geolocation information and network metrics information. Third party characteristics providers include, but are not limited to, Quova, Neustar IP Intelligence, MaxMind and IP2Location. Characteristics server 490, in embodiments, provides information that is used to identify an appropriate initial packet transfer rate.

Other information may also be useful for determining an initial packet transfer rate. For example, application-level information may be used by methods and systems of the invention to identify an initial packet transfer rate. Useful application-level information includes, but is not limited to, a user-agent string, a content type, a content length, a service type, an identity of a service or content provider, etc. In one embodiment, a user-agent string is used to determine whether the end-user system connects to the Internet by way of a wireless connection. For example, a user-agent string may identify a mobile web browser, such as mobile Safari, or a tablet or smartphone operating system, such as Android or iOS. In one embodiment, a service or content provider identifies a content type and/or a source of a content object, such as a streaming video file from Netflix, an audio file or mobile operating system file from Apple, a software patch file or service pack file from Microsoft, etc. Optionally, other characteristics about the content object are used to determine the packet transfer schedule, such as a size of the content object, whether the content object is a media object, a bit rate of the media object, whether the content object is a streaming media object, whether the streaming media object is a live media stream or a pre-recorded media stream, etc. Using this information, embodiments of the invention can implement an appropriate packet transfer schedule or initial packet transfer rate. For example, download of a software patch file may not be a time sensitive transfer, while download of a streaming video file may require sufficient throughput to ensure the streaming video file is watchable. Accordingly a transfer schedule for a software patch file may be on a "bandwidth as available" schedule, while a streaming video file may be on a "minimum required bandwidth" schedule meaning that a desired minimum bitrate may be necessary to ensure a good viewing experience for the user.

Various network characteristics may also impact the schedule for transmission of data packets, such as a network congestion. As will be understood by the skilled artisan, many residential internet providers utilize a shared capacity network connection for multiple residences in a neighborhood and, during peak usage times, this connection may become congested and/or saturated. For example, residential internet access can become slowed during evening hours due to congestion as residents begin to log onto their computers and stream video data, such as between the hours of about 5 pm to about midnight. Historical network congestion analytics can be utilized, in embodiments, by methods and systems of the invention to establish a suitable transmission schedule and/or packet transmission rate or maximum packet transmission rate during routine congestion periods. In embodiments, characteristic server 490 provides such congestion information. In other embodiments, network characteristics database 480 maintains and/or tracks this information.

Table I provides an excerpt from an example network characteristics database. As described above, additional categories of data can be included.

TABLE I

Sample Network Characteristics Database Excerpt

| End-User IP Address | ISP | Location | Link Speed | Last Transfer Rate | Wireless | User-Agent |
|---|---|---|---|---|---|---|
| 23.31.174.86 | Comcast | TN | 50 Mbps | 45 Mbps | No | — |
| 169.229.79.5 | Berkeley.edu | CA | 100 Mbps | — | No | Mozilla/5.0 (compatible; MSIE 10.0; Windows NT 6.1; Trident/6.0) |
| 166.216.157.101 | AT&T | WA | 8.25 Mbps | 1.1 Mbps | Yes | Mozilla/5.0 (iPhone; CPU iPhone OS 8_0 like Mac OS x) |
| 173.52.242.201 | Verizon | NY | 75 Mbps | — | No | Mozilla/5.0 (Macintosh; Intel Mac OS X 10.6; rv:32.0) |
| 69.76.216.21 | Time Warner | MO | 25 Mbps | 11 Mbps | Yes | Mozilla/5.0 (Linux; Android 4.4.2; SM-G900T Build/KOT49H) |

In embodiments, a network characteristics database may include a packet transfer rate sensitivity factor. In embodiments, a packet transfer rate sensitivity factor provides a limit to the amount a packet transfer rate may be adjusted in one adjustment step. For example, a packet transfer rate sensitivity factor may be a multiplicative factor, such as a factor between 0 and 1, that is applied to a desired change in the packet transfer rate. For example, if a packet transfer rate sensitivity factor is 0.5 and the adjustment algorithm indicates that the packet transfer rate should be adjusted by increasing the bit rate by 800 kbps, application of the packet transfer rate sensitivity factor will result in the packet transfer rate being increased by only 400 kbps. In various embodiments, the packet transfer rate sensitivity factor may be selected based on application-level information or geolocation or provider information or Internet address network characteristics provided by a characteristics server or listed in a network characteristics database.

Figure 5A:
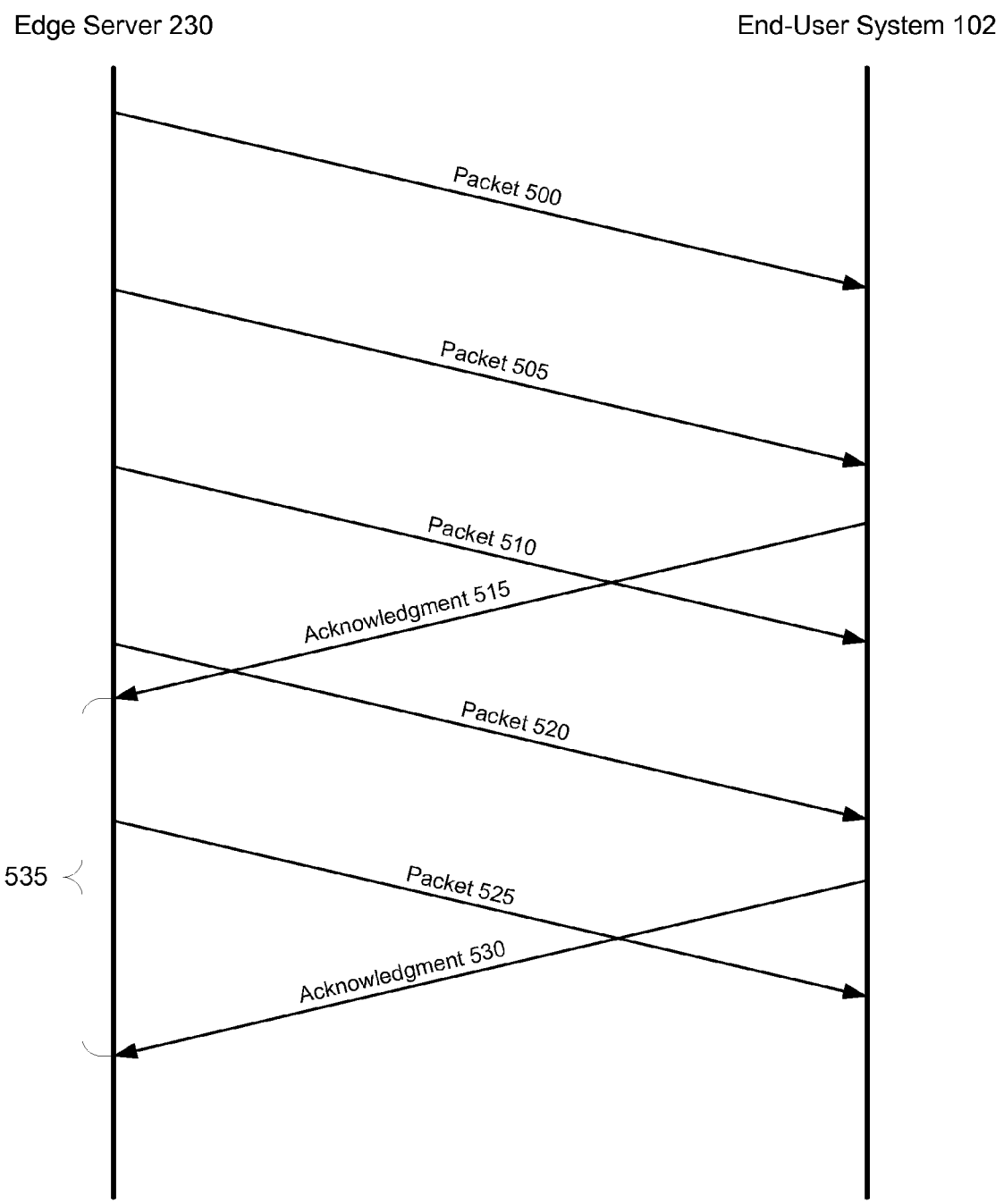
FIG. 5A and FIG. 5B depict packet transmission timing diagrams.
Figure 5B:
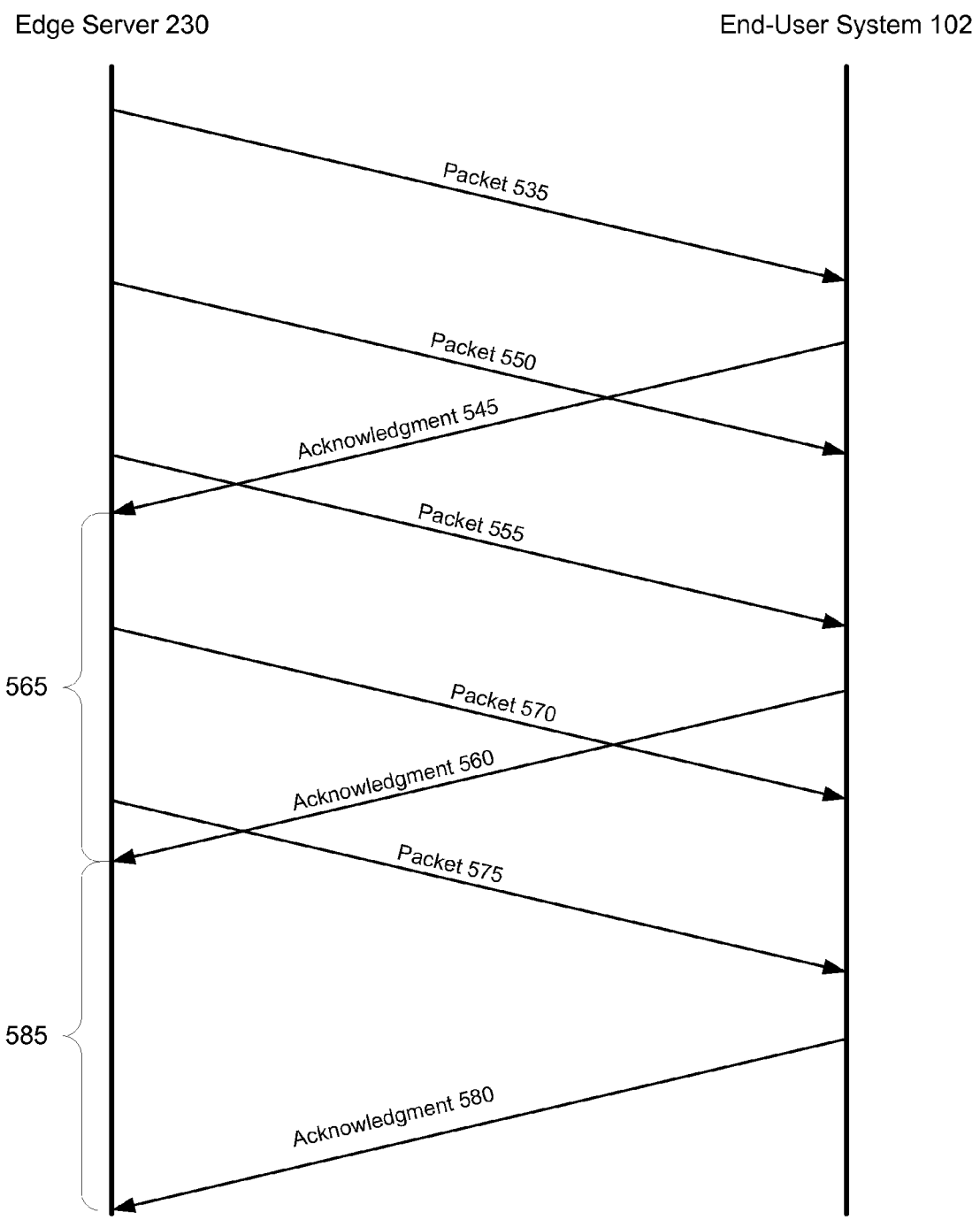

In embodiments, a series of packets can be transmitted to obtain a measurement of a data receipt rate by an end-user system 102, for example a series of 3 to 5 packets or more. FIGS. 5A and 5B illustrate timing diagrams for transmission of data packets and acknowledgment signals. In FIG. 5A, two packets, packet 500 and packet 505 are transmitted by edge server 230 to end user system 102. As will be understood by the skilled artisan, in a TCP delayed acknowledgment regime, these two packets will be received and processed before a first acknowledgment signal 515 will be transmitted by end-user system 102 to acknowledge receipt of packets 500 and 505. While acknowledgment signal 515 is en route to edge server 230, edge server 230 may continue to transmit additional packets 510 and 520. Before an acknowledgment signal 530 in response to packets 510 and 520 can be received, another packet 525 may be transmitted. Upon receipt of acknowledgment signal 530, a time difference 535 between receipt of acknowledgment signals 515 and 530 can be determined. For example, in embodiments, a timer may be implemented to determine time difference 535. As should be understood, the rate at which packets 500, 505, 510, 520 and 525 are transmitted by edge server 230 may not be limiting and additional information will be required for determining the rate at which the packets are received by the end-user system.

Depending upon which packet transmitted in a series of packets is first acknowledged in a delayed acknowledgment regime, two configurations may be necessary to illustrate obtaining two acknowledgment signals. As described above, FIG. 5A illustrates the configuration where the first two packets, 500 and 505, are acknowledged, as the packet immediately prior to packet 500 may have been acknowledged. In another configuration, illustrated in FIG. 5B, the first packet 540 of a series of packets may generate and acknowledgment signal 545, as this packet may correspond to the second received packet for which no acknowledgment signal was generated and so would require acknowledgment. After additional packets 550 and 555 are transmitted by edge server 230 and received by end-user system 102, end user system will generate another acknowledgement signal 560. The time difference 565 between acknowledgment signals 545 and 560 can be used to estimate the rate at which data is received by the end-user system 102 since the time necessary for end-user system 102 to receive packets 550 and 555 will be approximately reflected by time difference 565. Additional packets 570 and 575 of the series of packets can be transmitted by edge server 230 before end-user system 102 generates another acknowledgment signal 580. The time difference 585 between receipt of acknowledgment signals 560 and 580

Of course, as will be understood by the skilled artisan, variations in the network paths taken by each packet, various processing loads (e.g., of intermediate routers), etc., may impact the time necessary for packet transmission and receipt and, thus, the time differences 535, 565 and 585 may only be an approximate time measurement for the receipt of two packets. In some embodiments, where two or more time differences, such as time differences 565 and 585, are determined, a statistical analysis may be performed. For example, an average may be obtained, the smaller of two time differences may be used as a guide for determining the maximum rate at which the end-user system can receive data or the larger of two time differences may be used as a guide for determining the minimum rate at which the end-user system can receive data. Other statistical analyses are possible and may incorporate any number of time differences. For example, a running average may be determined, such as a running average of 5 or more, 10 or more or 20 or more time differences, which may provide advantages in rate smoothing and reducing sensitivity to erroneous differences due to lost or delayed packets that may otherwise indicate a slower data rate is required when there may have been a temporary delay of one or a few packets that might otherwise not impact the long-term data receipt rate.

In certain embodiments, a series of packets, such as a series of 5 packets, as illustrated in FIGS. 5A and 5B can be intentionally transmitted at a rate faster than a current transmission rate in order to determine whether the receiving system is capable of receiving the data packets at a faster rate. The use of a small amount of data packets in this fashion is advantageous, as such a configuration will provide at least one and potentially three time differences with which to observe the rate at which data is received, processed and/or acknowledged by the receiving system, while such a small number of packets reduces the likelihood that the packet stream will overwhelm a network buffer and result in dropped data packets.

For network transmissions which experience high latencies, the advantages achieved by the present invention can be magnified. For example, in a system where a round trip time period is large, such as 0.2 seconds or more, a large number of packets may be transmitted before the first acknowledgment receipt is received and this may result in overwhelming and filling a network buffer at a slow link, resulting in dropped packets that will need to be retransmitted. As will be understood by the skilled artisan, such dropping of packets will result in the normal TCP congestion control algorithms reducing the rate at which packets are sent, and may significantly slow the transmission of data to a level lower than optimal while the TCP protocol slowly determines an appropriate data rate.

In contrast, aspects of the invention may begin transmitting data at a suitable rate almost immediately, such as by using the above described techniques to establish an initial packet transfer rate, with the first 3-5 successfully transmitted data packets generating acknowledgment signals that can be used as a measurement of a more refined transfer rate. In addition, use of the described scheme can reduce buffer overflows both at the receiving system and at intermediate nodes between the transmitting system and the receiving system, reducing the likelihood of dropped packets and/or transfer rate reductions.

In other embodiments, data may be transmitted at a ramped rate, such as at the beginning of a data transmission or when little or no data is available for transmission. For example, in one situation a burst of packets may be transmitted with the initial packet transfer rate spaced by a small amount with larger spacings between subsequent packets. In this way, the chance of loss of packets may be reduced due to overfilling network buffers, while still accumulating a number of acknowledgment signals that can be used to estimate the rate at which packets can be received and thus to allow refinements to the rate at which packets can be transmitted.

In some situations, one or more acknowledgments may be received at a rate faster than the rate at which the packet were originally transferred. For these situations, embodiments include discounting or ignoring the acknowledgments that are received at a rate faster than the rate at which the packets were transmitted and the associated time periods between received acknowledgements. Such a situation may be an anomalous result that is not indicative of the rate at which packets can actually be received by the receiving system. Optionally, such a situation may require additional acknowledgments to be received before adjustments to the rate of data packet transmission are made.

Figure 6A:
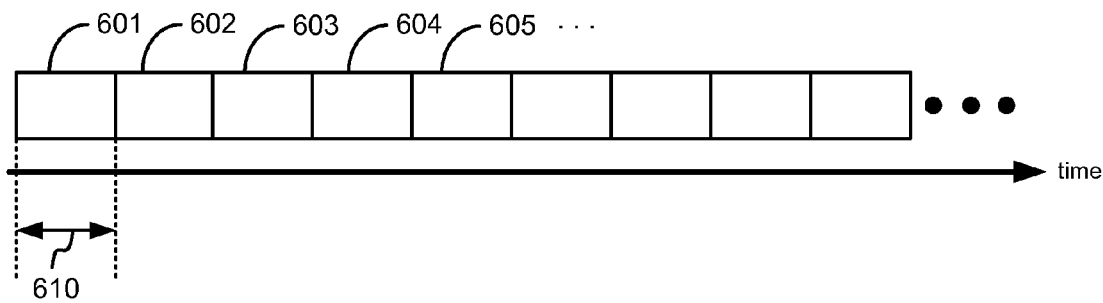
FIG. 6A, FIG. 6B and FIG. 6C timelines showing packet transmission schemes.
Figure 6B:
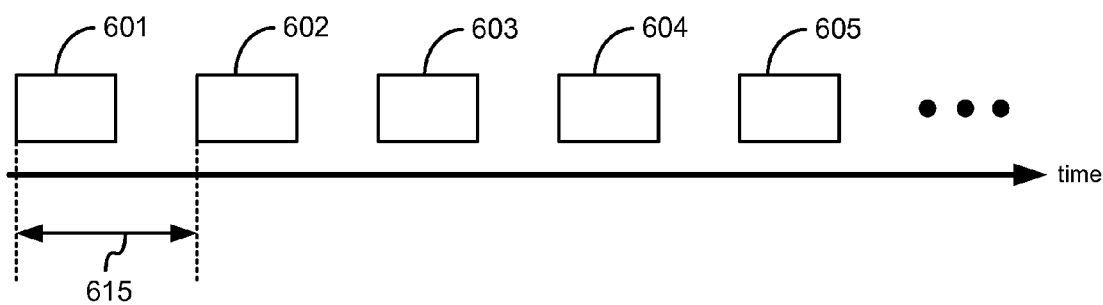
Figure 6C:
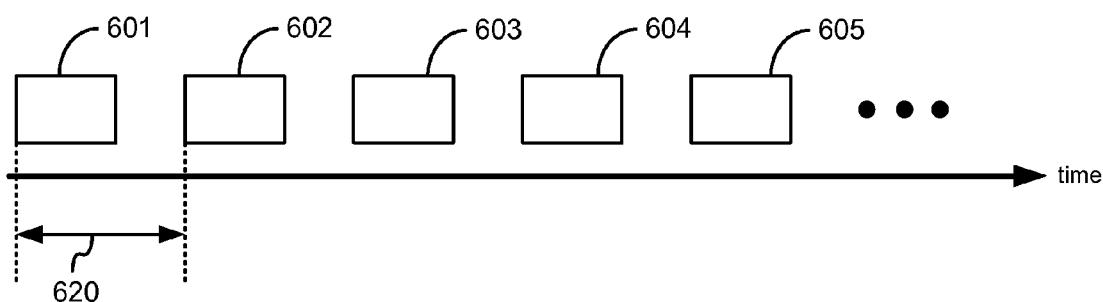

FIGS. 6A, 6B and 6C illustrate alternative views of timing diagrams for transmission of data packets. In these figures, data packets 601, 602, 603, 604, 605, etc., are illustrated. Time period 610 may correspond to the time necessary for the transmitting system, such as an edge server of a CDN POP to transmit a full size packet. As shown in FIG. 6A, some systems may simply transmit data packets as fast as possible. Instead of transmitting data packets as fast as possible, methods and systems of the invention may use an initial packet transfer rate, which uses a fixed delay 615 between the start of successive packet transmissions that is longer than the time period 610 necessary for transmitting a single packet. In exemplary embodiments, delay 615 corresponds to the time duration necessary for the receiving system to receive, process and acknowledge a single packet. In embodiments, delay 615 may be adjusted in order to investigate whether the receiving system is capable of receiving data packets at a faster rate. Such a configuration is schematically illustrated in FIG. 6C, which shows data packets transmitted with a fixed delay 620 between the start of successive packet transmission that is smaller than delay 615. Other implementations are possible, including where a variable or non-fixed delay is used.

Figure 7A:
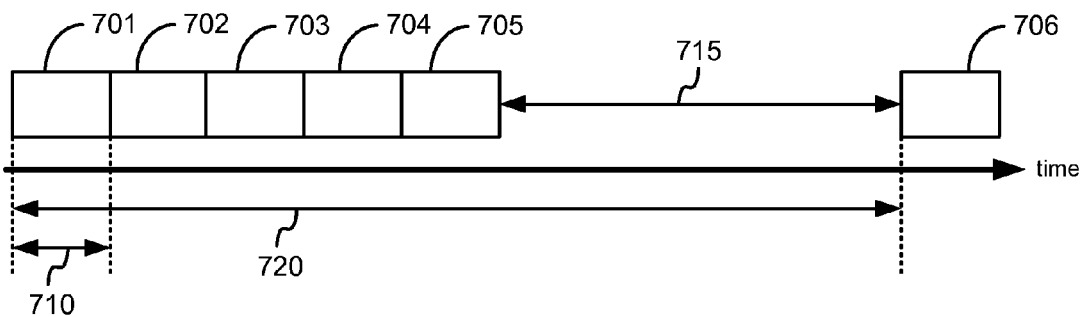
FIG. 7A, FIG. 7B and FIG. 7C timelines showing packet transmission schemes.
Figure 7B:
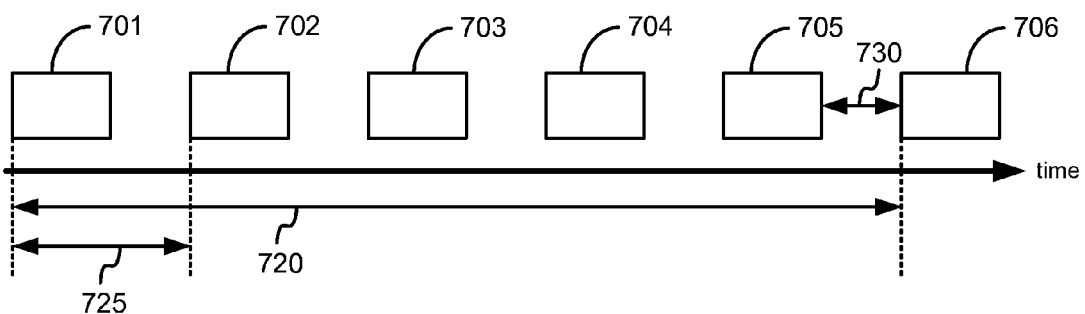
Figure 7C:
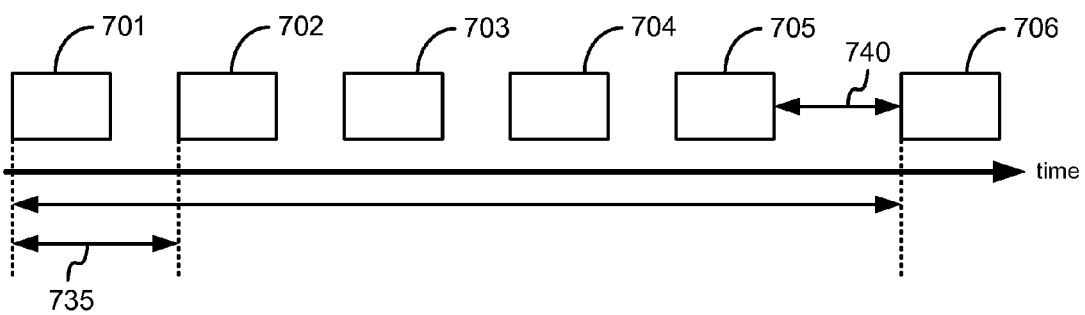

FIGS. 7A, 7B and 7C illustrate alternative views of timing diagrams for transmission of data packets. In these figures, data packets 601, 602, 603, 604, 605, etc., are illustrated. Here, time period 710 corresponds to the time necessary for transmission of a single packet. In this embodiment, the round trip latency may be sufficiently low that during transmission of one packet, an acknowledgment signal is received for one or more prior packets with a TCP window size of zero, which will result in the transmission of data being stopped. As illustrated in FIG. 7A during transmission of packet 705, the transmitting system receives an acknowledgement signal indicating that it should halt transmission. For example, time period 720 may correspond to the time required for transmission and receipt of data packets 701, 702, 703, 704 and 705, with a time delay 715 during which packets cannot be transmitted. Upon receipt of an appropriate acknowledgment signal, transmission of packet 706 may be resumed. The present invention minimizes this associated delay 715 while providing a smoothed data transmission schedule. Here time period 720 may correspond to the time required to transmit and receive five data packets, 701, 702, 703, 704 and 705. If this time period is equally divided amongst the five packets, each packet will be transmitted a time period 725 after the previous packet. This will result in a small delay 730 between successive packet transmissions, but will result in a more uniform transmission and delivery of packets.

Although the embodiments illustrated in FIGS. 7A-7C illustrate the transmission of 5 packets followed by a $6^{th}$ packet, which may not overwhelm and fill a network buffer, embodiments are contemplated where the transmitting system may transmit significantly more packets all immediately sequentially, such as 10 or more or 20 or more or 50 or more packets. Transmitting significantly more packets immediately sequentially, as may be performed by prior TCP transport layer algorithms, may result in lost packets and overall longer time periods required for the transmission and potential retransmission of packets as the transport layer determines an appropriate packet transfer rate. As described herein, embodiments, such as the embodiment illustrated in FIG. 7B, utilize a packet transfer schedule that smooths the transmission of data packets to optionally match the transmission rate with the rate at which data packets can be received and processed. As described above, some limited burst of data packets at a slightly faster rate may be useful for probing whether the receiving system may be capable of receiving packets more quickly. FIG. 7C illustrates such a configuration, where five data packets are sent with each packet transmission spaced by a time period 735, which is shorter than the period 725. In the embodiment shown in FIG. 7C, the receiving system is not capable of receiving the data at a faster rate and so the delay 740 between the packets 705 and 706 may be larger than the delay 730 between packets shown in FIG. 7B.

Figure 8:
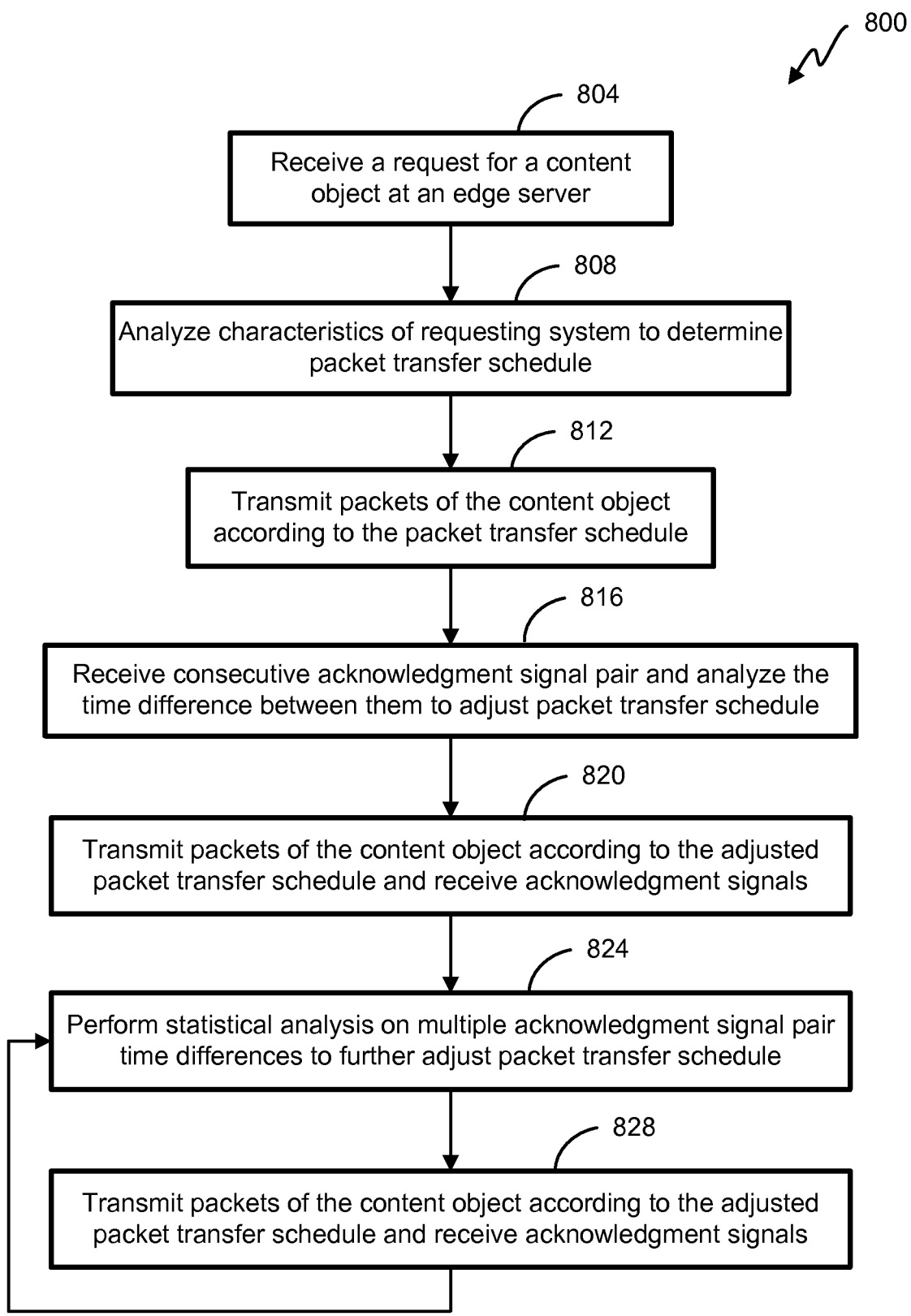
FIG. 8 illustrates a flowchart of an embodiment of a process for delivering a content object over the Internet.

FIG. 8 illustrates a flowchart of an embodiment of a process 800 for delivering a content object over the Internet. In this embodiment, the transfer rate of packets is adjusted according to a method of the invention by monitoring time differences between receipt of consecutive acknowledgment signals. Initially, at 804, a request for a content object is received, such as by an edge server. The edge server may be a file server or other web server used for serving content objects over the Internet to requesting systems. Characteristics of the requesting system are analyzed, at 808, to determine a packet transfer schedule. At 812, packets including portions of the content object are transmitted according to the packet transfer schedule. In response, at 816, acknowledgment signals are received and a timing of receipt of a pair of consecutive acknowledgment signals is analyzed to adjust the packet transfer schedule. For example, if the timing of the pair of consecutive acknowledgment signals indicates that the packets including portions of the content object are being received at a rate slower than the rate at which the packets are being transmitted, the packet transfer schedule may be adjusted to reduce the transmission rate to be equal to or less than the receipt rate. In another example, the timing may indicate that the receiving system is capable of receiving packets at a faster rate and the packet transfer schedule may be adjusted accordingly. In any event, at 820, packets including portions of the content object are transmitted according to an adjusted packet transfer schedule and further acknowledgment signals are received. As additional acknowledgment signals are received, each pair of consecutive acknowledgment signals can be used to compute a time difference and serve as a data point to determine the rate at which packets, and data, are being delivered to the receiving system. At 824, a statistical analysis may be performed, such as an averaging, to determine a refined packet transfer schedule. In embodiments, a statistical determination may be performed to determine a suitable maximum packet transfer rate, such as a rate that is a fraction of a maximum observed transfer rate or a rate that is a usable sustained packet transfer rate. At 828 additional packets may be transmitted according to a further updated packet transfer schedule with optional repetition of refining the packet transfer schedule based on received acknowledgment signals.

Figure 9:
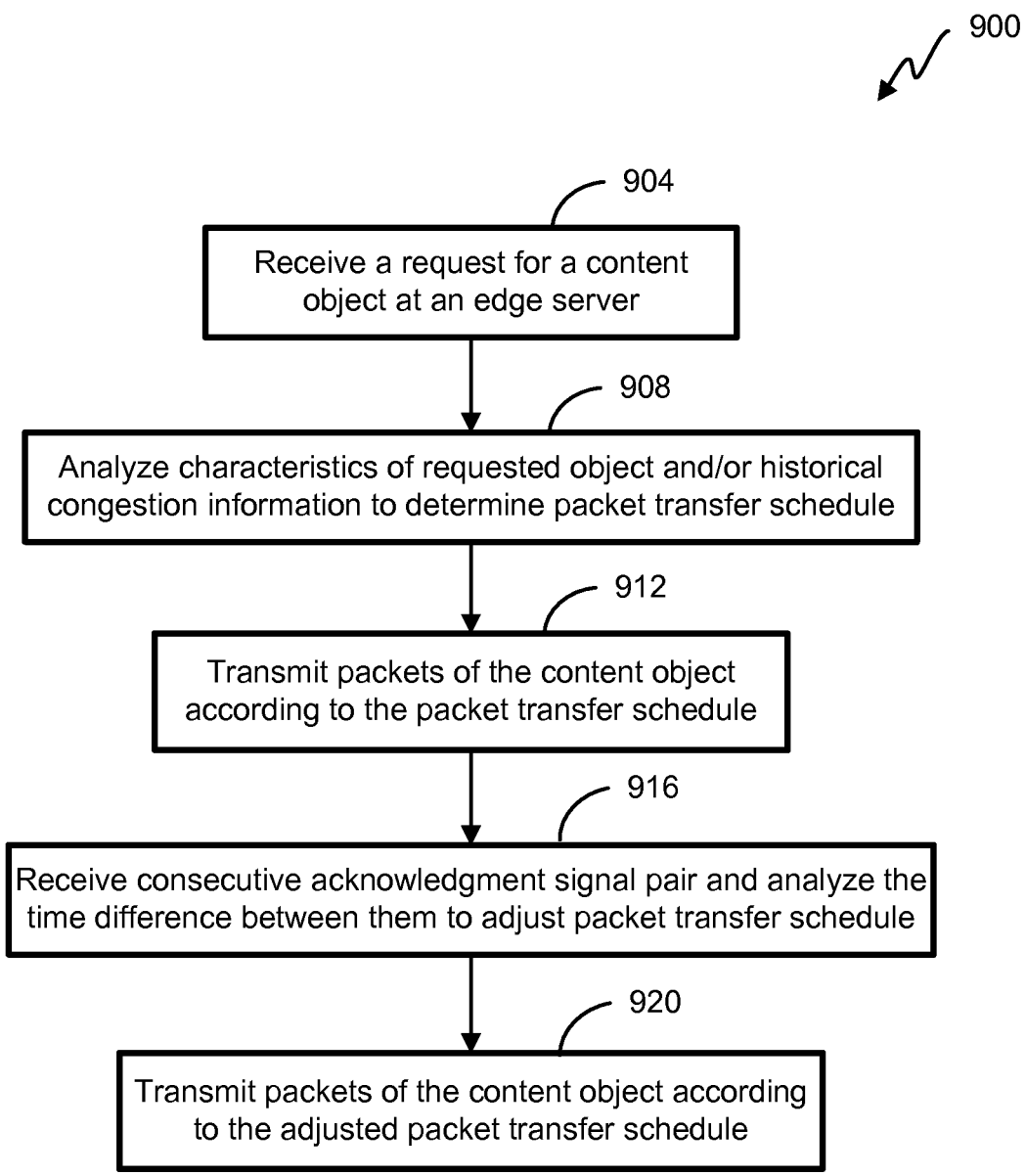
FIG. 9 illustrates a flowchart of an embodiment of a process for delivering a content object over the Internet.

FIG. 9 illustrates a flowchart of an embodiment of a process 900 for delivering a content object over the Internet. This embodiment uses application level information relating to the requested object and/or historical network characteristics information to determine a suitable packet transfer schedule. Initially, at 904, a request for a content object is received. At 908, characteristics of the requested content object and/or historical congestion information are analyzed to determine a packet transfer schedule. For example, it may be determined that the time/day of the week at which the content object is requested is typically a time for which network traffic to the receiving system may experience congestion and/or low available bandwidth. At 912, packets of the content object are transmitted according to the packet transfer schedule. As with the embodiment illustrated in FIG. 8, at 916, consecutive acknowledgement signals can be used to make adjustments to the packet transfer schedule so that additional packets of the content object can be transmitted, at 920, according to the adjusted packet transfer schedule.

Figure 10:
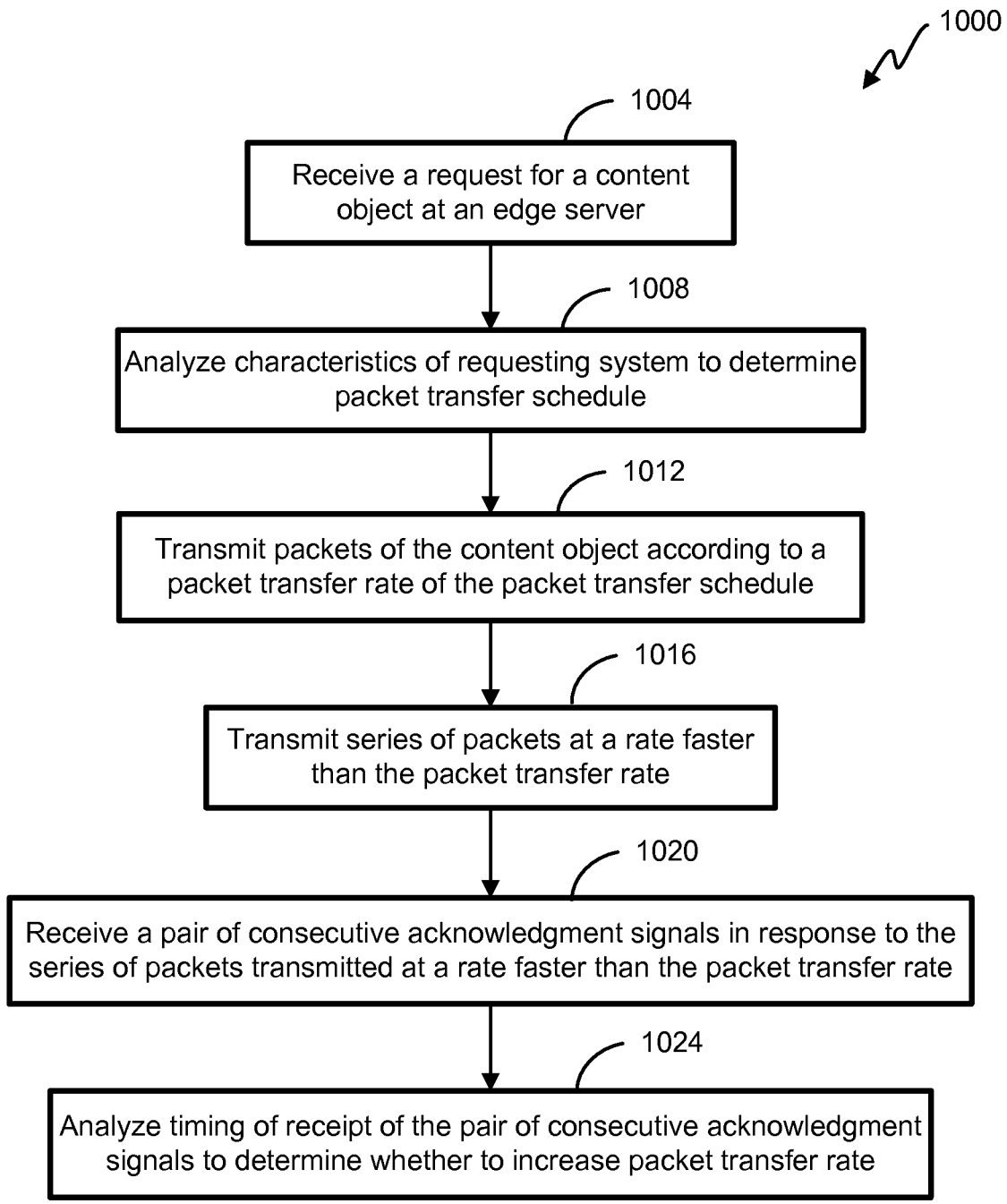
FIG. 10 illustrates a flowchart of an embodiment of a process for delivering a content object over the Internet.

FIG. 10 illustrates a flowchart of an embodiment of a process 1000 for delivering a content object over the Internet. In this embodiment, characteristics of the requesting system are used to determine a suitable initial packet transfer rate and an investigation may be performed to determine whether the receiving system is capable of receiving packets at a higher data rate. Initially, at 1004, a request for a content object is received. At 1008, characteristics of the requesting system are analyzed to determine a packet transfer rate. For example, it may be determined that the requesting system has a wireless network connection and so may be only capable of receiving data at a maximum rate, such as a rate limited by an 802.11b wireless network. At 1012, packets containing portions of the content object may be transmitted, such as according to the initial packet transfer rate. At 1016, a series of packets is transmitted at a rate faster than the packet transfer rate established by the packet transfer schedule. In embodiments, such a situation may occur so that the transmitting system can determine whether to increase the packet transfer rate. In embodiments, 4 or more packets may be included in the series of packets. At 1020, two consecutive acknowledgment signals are received in response to the series of packets and at 1024, the timing of their receipt is analyzed to determine whether to increase the packet transfer rate. As illustrated in FIGS. 5A and 5B when five packets are transmitted, this may provide with the ability to receive at least two consecutive acknowledgment receipts when delayed acknowledgment configurations apply, which provides the ability to determine an approximate rate at which packets can be received by the receiving system. If additional acknowledgment receipts are received for transmission of packets at a rate faster than that specified by the packet transfer schedule, additional analysis can be performed, such as to use the faster of two or more measurements or to average two or more measurements, etc.

Figure 11:
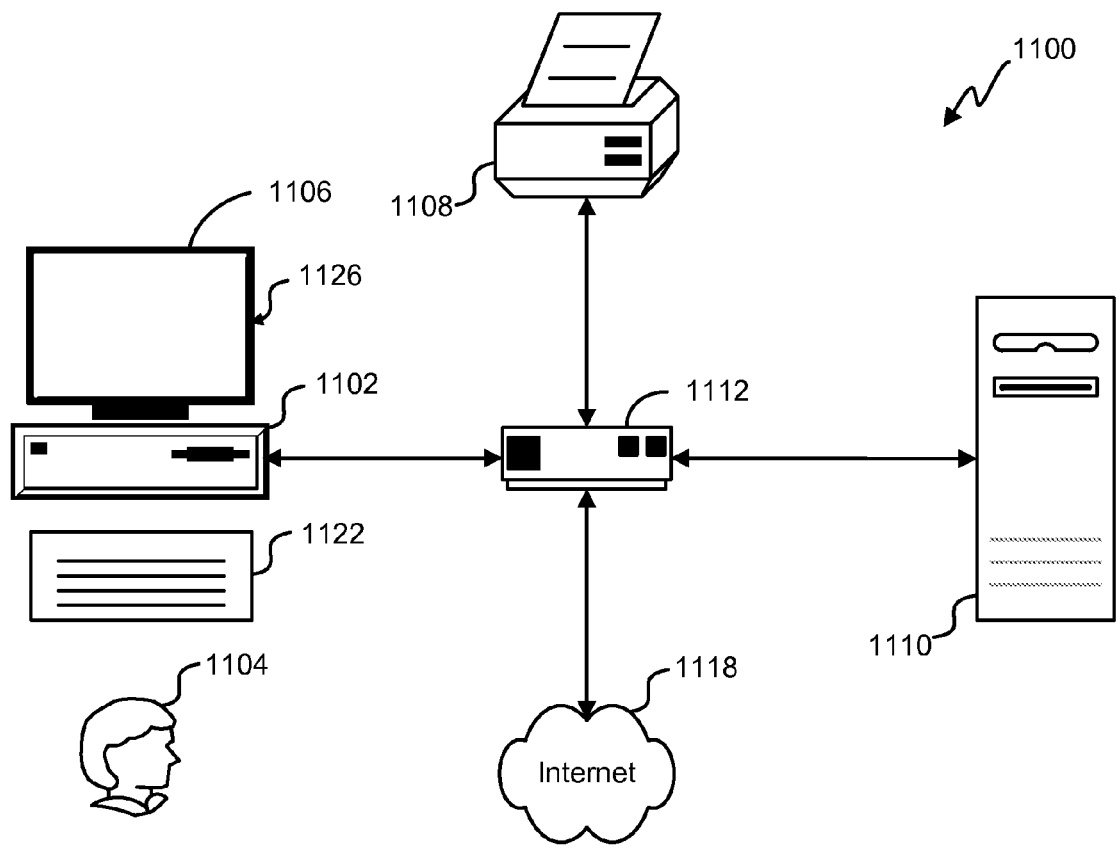
FIG. 11 depicts a block diagram of an embodiment of a computer system.

Referring next to FIG. 11, an exemplary environment with which embodiments may be implemented is shown with a computer system 1100 that can be used by a designer 1104 to design, for example, electronic designs. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

With reference to FIG. 12, an embodiment of a special-purpose computer system 1200 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft Corporation, Solaris® from Sun Microsystems, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for delivering content objects from a content delivery network to client systems over an Internet, comprising:
   a server, wherein the server is configured to:
      receive requests to deliver content objects to client systems, wherein:
         the requests are from client systems;
         the server is one of a plurality of servers in a point of presence of a content delivery network;
         the content delivery network includes a plurality of points of presence distributed geographically; and
         the content delivery network delivers content over the Internet to client systems;
   a cache for storing a schedule of timing and rates of transmissions of packets of data including portions of requested content objects, wherein
      the schedule includes an initial packet transfer rate;
   the server being further configured to:
      determine the schedule;
      transmit a first plurality of packets of data according to the schedule, wherein:
         portions of requested content objects are distributed among the first plurality of packets of data;
      receive acknowledgment signals in response to packets of data of the first plurality of packets of data;
      determine changes to the schedule based on a timing of receipt of the acknowledgement signals in response to packets of data of the first plurality of packets of data, wherein:
         a time difference between receipt of consecutive acknowledgment signals in response to packets of data of the first plurality of packets of data is used to determine an updated packet transfer rate; and
         changes to the schedule are made using the updated packet transfer rate; and
      transmit a second plurality of packets of data according to the schedule, wherein:
         portions of requested content objects are distributed among the second plurality of packets of data.

2. The system of claim 1, wherein the server is further configured to:
   transmit a third plurality of packets of data at a rate faster than the updated packet transfer rate, wherein portions of requested content objects are distributed among the third plurality of packets of data;
   receive acknowledgment signals in response to packets of data of the third plurality of packets of data;
   determine changes to the schedule based on a timing of receipt of the acknowledgment signals in response to packets of data of the third plurality of packets of data, wherein:
      a time difference between receipt of consecutive acknowledgment signals in response to packets of data of the third plurality of packets of data is used to determine a further updated packet transfer rate; and
      changes to the schedule are made using the further updated packet transfer rate; and transmit a fourth plurality of packets of data according to the schedule, wherein portions of requested content objects are distributed among the fourth plurality of packets of data.

3. The system of claim 1, wherein the server is further configured to:
receive requests to deliver content objects to a plurality of client systems having a common network subnet; and
use the schedule for transmitting packets of data for requested content to the plurality of client systems.

4. The system of claim 1, wherein a plurality of time differences between receipt of consecutive acknowledgment signals in response to packets of data of the first plurality of packets of data are used in a statistical analysis to determine the updated packet transfer rate.

5. The system of claim 1, wherein the server is configured to determine the schedule by receiving application level information from a client system and selecting the initial packet transfer rate based on the application level information.

6. The system of claim 5, wherein the application level information includes a client application User-Agent or a content type or content length of the content objects.

7. The system of claim 1, wherein the server is configured to determine the schedule by receiving Internet address geolocation or provider information or Internet address network characteristics and selecting the initial packet transfer rate based on the Internet address geolocation or provider information or Internet address network characteristics.

8. The system of claim 7, wherein the Internet address geolocation or provider information or Internet address network characteristics identifies a client wireless network connection and wherein the initial packet transfer rate is selected to match characteristics of a wireless network connection to the client system.

9. The system of claim 7, wherein changes to the schedule are determined using a sensitivity factor that is dependent upon the Internet address geolocation or provider information or the Internet address network characteristics.

10. The system of claim 1, wherein the server is configured to determine the schedule using one or more of a time of day, a day of week, historical network congestion information, historical client network characteristics or historical client system Internet service provider characteristics.

11. A method for delivering content objects from a content delivery network to client systems over an Internet, the method comprising:
receiving a request to deliver one or more content objects to a client system, wherein:
the request is received at a server;
the request is received from the client system;
the server is one of a plurality of servers in a point of presence of a content delivery network;
the content delivery network includes a plurality of points of presence distributed geographically; and
the content delivery network delivers content over the Internet to client systems;
determining a schedule for transmitting packets of data including portions of the one or more content objects, wherein:
the schedule includes an initial packet transfer rate;
transmitting a first plurality of packets of data according to the schedule, wherein:
portions of the one or more content objects are distributed among the first plurality of packets of data;
receiving acknowledgment signals in response to packets of data of the first plurality of packets of data;
determining changes to the schedule based on a timing of receipt of the acknowledgment signals in response to packets of data of the first plurality of packets of data, wherein:
a time difference between receipt of consecutive acknowledgment signals in response to packets of data of the first plurality of packets of data is used to determine an updated packet transfer rate; and
changes to the schedule are made using the updated packet transfer rate; and
transmitting a second plurality of packets of data according to the schedule, wherein:
portions of the one or more content objects are distributed among the second plurality of packets of data.

12. The method of claim 11, further comprising:
transmitting a third plurality of packets of data at a rate faster than the updated packet transfer rate, wherein portions of the one or more content objects are distributed among the third plurality of packets of data;
receiving acknowledgment signals in response to packets of data of the third plurality of packets of data;
determining changes to the schedule based on a timing of receipt of the acknowledgment signals in response to packets of data of the third plurality of packets of data, wherein:
a time difference between receipt of consecutive acknowledgment signals in response to packets of data of the third plurality of packets of data is used to determine a further updated packet transfer rate; and
changes to the schedule are made using the further updated packet transfer rate; and
transmitting a fourth plurality of packets of data according to the schedule, wherein portions of the one or more content objects are distributed among the fourth plurality of packets of data.

13. The method of claim 11, wherein the client system is a first client system, the method further comprising:
receiving a second request to deliver one or more additional content objects to a second client system, wherein:
the second request is received at the server;
the request is received from the second client system;
the second client system is on a same network subnet as the first client system;
transmitting a third plurality of packets of data to the second client system according to the schedule, wherein:
the schedule includes the updated packet transfer rate;
portions of the one or more additional content objects are distributed among the third plurality of packets of data.

14. The method of claim 11, wherein a plurality of time differences between receipt of consecutive acknowledgment signals in response to packets of data of the first plurality of packets of data are used in a statistical analysis to determine the updated packet transfer rate.

15. The method of claim 11, wherein determining the schedule includes receiving application level information from the client system and selecting the initial packet transfer rate based on the application level information.

16. The method of claim 15, wherein the application level information includes a client application User-Agent or a content type or content length of the one or more content objects.

17. The method of claim 11, wherein determining the schedule includes receiving Internet address geolocation or provider information or Internet address network characteristics and selecting the initial packet transfer rate based on the Internet address geolocation or provider information or Internet address network characteristics.

18. The method of claim 17, wherein the Internet address geolocation or provider information or Internet address network characteristics identifies a client wireless network connection and wherein the initial packet transfer rate is selected to match characteristics of a wireless network connection to the client system.

19. The method of claim 11, wherein determining the schedule includes using one or more of a time of day, a day of week, historical network congestion information, historical client network characteristics or historical client system Internet service provider characteristics.

20. A computer-program product tangibly embodied in a non-transitory machine-readable storage medium, comprising instructions that, when executed by one or more processors in a computing device, cause the computing device to:

receive requests to deliver content objects to client systems;

determine a schedule of timing and rates of transmissions of packets of data including portions of requested content objects;

transmit a first plurality of packets of data according to the schedule, wherein:
    portions of requested content objects are distributed among the first plurality of packets of data;

receive acknowledgment signals in response to packets of data of the first plurality of packets of data;

determine changes to the schedule based on a timing of receipt of the acknowledgement signals in response to packets of data of the first plurality of packets of data, wherein:
    a time difference between receipt of consecutive acknowledgment signals in response to packets of data of the first plurality of packets of data is used to determine an updated packet transfer rate; and
    changes to the schedule are made using the updated packet transfer rate; and transmit a second plurality of packets of data according to the schedule, wherein:
    portions of requested content objects are distributed among the second plurality of packets of data.

* * * * *